United States Patent
Dover

(10) Patent No.: US 7,264,063 B1
(45) Date of Patent: Sep. 4, 2007

(54) SOD HARVESTER WITH CONTROLLED SOD CUT-OFF AND CONVEYING SYSTEM

(75) Inventor: Gary H. Dover, Bucyrus, KS (US)

(73) Assignee: Bucyrus Equipment Co., Inc, Hillsdale, KS (US)

( * ) Notice: Subject to any disclaimer, the term of this patent is extended or adjusted under 35 U.S.C. 154(b) by 0 days.

(21) Appl. No.: 10/896,822

(22) Filed: Jul. 22, 2004

(51) Int. Cl.
*A01B 41/06* (2006.01)
(52) U.S. Cl. .................................. 172/2; 172/20
(58) Field of Classification Search .......... 172/19, 172/20
See application file for complete search history.

(56) References Cited

U.S. PATENT DOCUMENTS

| | | | |
|---|---|---|---|
| 3,590,927 A * | 7/1971 | Brouwer et al. | 172/20 |
| 3,913,682 A * | 10/1975 | Kaercher et al. | 172/20 |
| 4,832,130 A | 5/1989 | Brouwer et al. | |
| 5,269,379 A * | 12/1993 | Millar et al. | 172/19 |
| RE34,827 E | 1/1995 | Dover et al. | |
| 5,571,252 A * | 11/1996 | Worrel et al. | 172/20 |
| 5,626,195 A | 5/1997 | Dover | |
| 6,244,354 B1 * | 6/2001 | Van Vuuren | 172/19 |
| 6,273,196 B1 * | 8/2001 | Van Vuuren | 172/20 |
| 6,659,189 B2 * | 12/2003 | Woerner et al. | 172/20 |
| 6,681,864 B2 * | 1/2004 | Tvetene et al. | 172/20 |
| 7,070,004 B2 * | 7/2006 | Hendriks et al. | 172/20 |
| 2005/0016743 A1 * | 1/2005 | Hendriks et al. | 172/19 |

OTHER PUBLICATIONS

Advertising materials of Trebro Manufacturing showing Harvestack Automatic Stacking Harvester believed to have been on sale for more than one year prior to the filing date of the present application.
Advertising material of Auburn Gear showing Wheel planetary gear drives believed to have been on sale for more than one year prior to the filing date of the present application.
Advertising materials of Sauer Danfoss showing KPP Pulse Pickup believed to have been on sale for more than one year prior to the filing date of the present application.
Advertising materials of Danfoss Hydraulics showing Hydraulic Motors with speed sensor, types OMM EM, OMP EM, OMR EM, OMS EM, OMSW EM, OMT EM and OMV EM believed to have been on sale for more than one year prior to the filing date of the present application.

* cited by examiner

*Primary Examiner*—Thomas B. Will
*Assistant Examiner*—Jamie L McGowan
(74) *Attorney, Agent, or Firm*—Erickson & Kleypas, LLC

(57) ABSTRACT

A sod harvester includes a sod cut-off system driven by a hydraulic actuator controlled by a processor in response to signals from a ground speed sensor to cut a strip of sod to a desired length. The controller also operating to control the speed of conveyors used to roll the sod into a roll. The sensor measures the rotations of a ground wheel and produces a signal which is used by a processor on the harvester to determine the distance traveled by the harvester. A control valve assembly and a high pressure hydraulic fluid accumulator provide for rapid extension of the actuators to produce a rapid downward cutting action of the cutting blades. A hydraulic motor connected in driving relationship to an outer rear wheel of the harvester provides power thereto to overcome the tendency of the tractor to drift to that side.

18 Claims, 17 Drawing Sheets

Fig. 4.

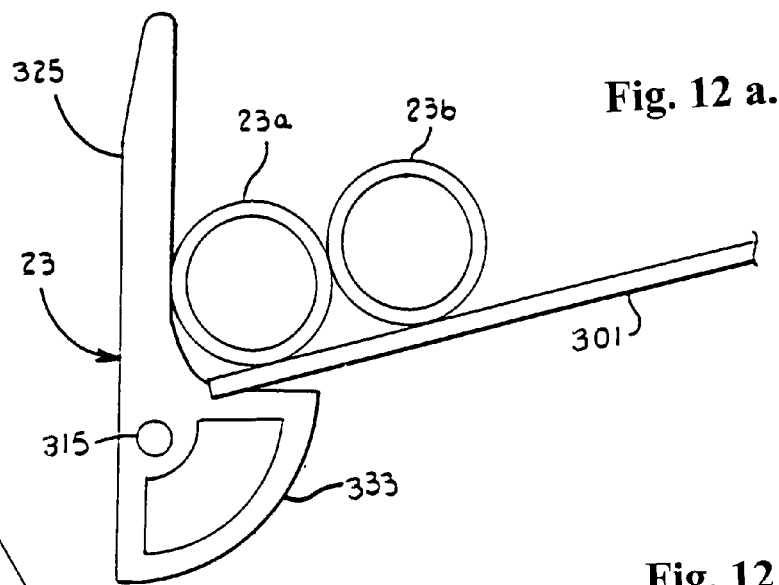
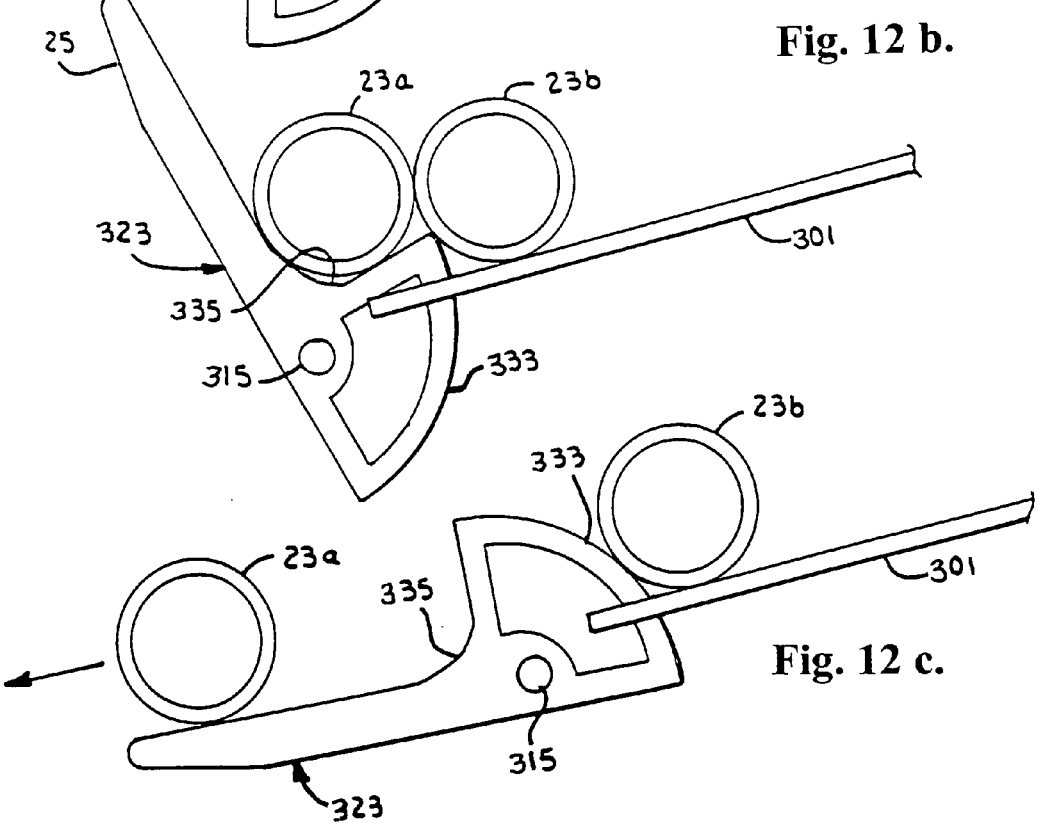
Fig. 12 a.
Fig. 12 b.
Fig. 12 c.

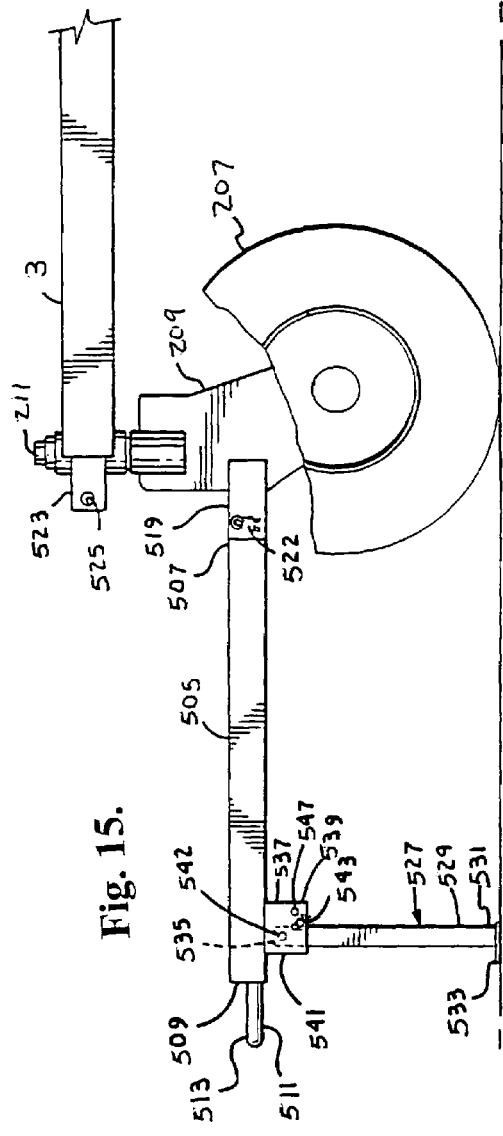
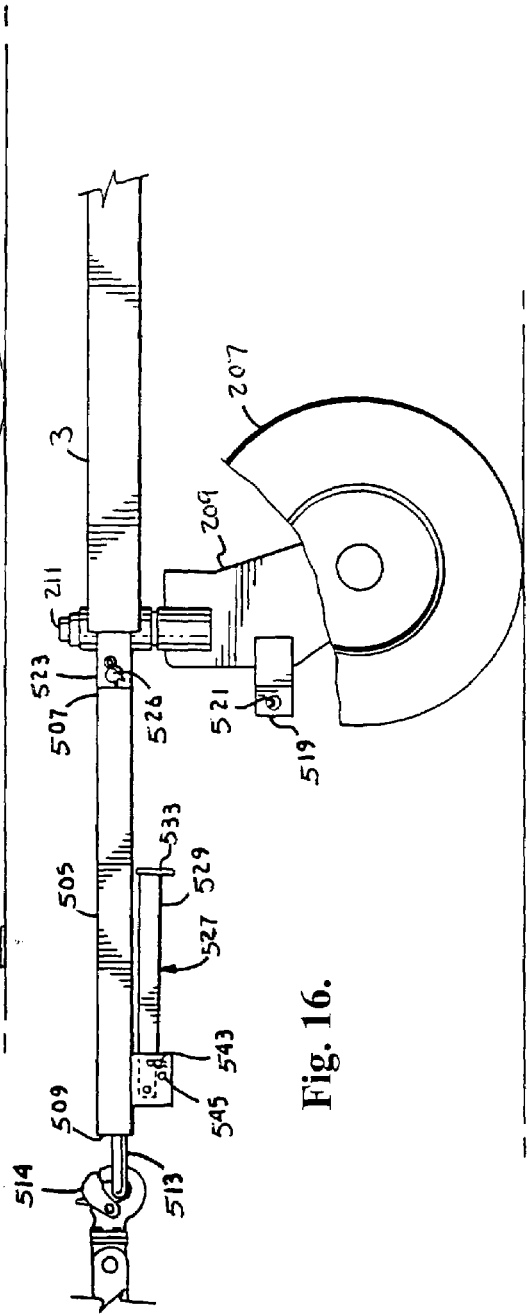
Fig. 15.
Fig. 16.

US 7,264,063 B1

SOD HARVESTER WITH CONTROLLED SOD CUT-OFF AND CONVEYING SYSTEM

BACKGROUND OF THE INVENTION

1. Field of the Invention

This invention relates to sod harvesters, and in particular to systems for controlling the process of cutting a strip of sod to a desired length and controlling conveyors used in forming the cut sod into a roll.

2. Description of the Related Art

U.S. Patents Nos. Re. 34,827 to Dover and 5,626,195 to Dover et al., disclose sod harvesters having one or more cutting blades for cutting sod from the ground, an inclined conveyor for conveying the sod away from the cutting blade and which functions alone, or with other conveyors to assist informing the sod into a roll, and a sod cut-off mechanism for cutting the strip of sod to a desired length. The sod cut-off mechanism shown in U.S. Pat. No. 5,626,195 comprises a pair of knife blades slidably mounted on support arms and driven downward by the action of sets of springs. The raising and lowering of the knife blades is generally controlled by a rotating cam which is driven by a chain extending around a first sprocket on a common shaft with the cam and around a second sprocket on a shaft of a ground engaging roller. To change the length of sod to be cut by the harvester, a mechanical or physical change must be made to the cut-off system, such as for example replacing the first sprocket on the common shaft with the cam with a sprocket of a different size. Such changes are time consuming to make and generally cannot be made in the field or while the harvester is being utilized to harvest sod.

Another limitation of such prior art sod harvesters is that an operator must continually monitor and manually adjust the speed of the conveyors to try to match the ground speed of the harvester, to ensure that the rolls form properly. The conveyors of such prior art harvesters are typically driven by a hydraulic motor. An operator adjusts the speed of the hydraulic motors manually by adjusting a knob controlling a valve which controls the flow of hydraulic fluid to the motor. Because the speed of the harvester constantly varies during the sod harvesting process, the operator must continually monitor and adjust the speed of the conveyors. If the speed of the conveyors exceeds the harvester ground speed the system for rolling the sod will place the strip of sod under tension and may tear the strips. If the speed of the conveyors is slower than the harvester ground speed, the rolls formed will be too loose and difficult to transport and handle.

What is needed is a sod harvester having a sod-cut off mechanism which can be controlled to selectively change the length of the strips of sod harvested without having to make a mechanical change to the harvester. The control system would also preferably provide for automatic adjustment of the conveyor speeds relative to the ground speed of the harvester.

SUMMARY OF THE INVENTION

The present invention comprises a system for controlling the mechanisms for cutting a strip of sod to a desired length in a sod harvester and for controlling the speed of conveyors used to roll the sod into a roll. The systems may be utilized in a tractor mounted sod harvester of the type having one or more sod cutting mechanisms for cutting or stripping the sod from the ground, a conveyor system for conveying the sod away from the cutting mechanism and for forming the sod into a roll and a sod cut-off mechanism for cutting the stripped sod to a desired length. A sensor is mounted on the harvester and produces a signal which is used by a processor on the harvester to determine the distance traveled by the harvester. Upon determining that the harvester has traveled a selected distance, the processor activates the sod cut-off mechanism to cut the strip of sod cut from the ground to the desired length. A preferred embodiment of the sod cut-off mechanism includes a cutting blades mounted on parallelogram linkages and driven by hydraulic actuators. A control valve assembly and a high pressure hydraulic fluid accumulator provide for rapid extension of the actuators to produce a rapid downward cutting action of the cutting blades.

The information generated by the sensor is also used by the processor to determine the speed of the harvester and adjust the speed of the conveyors accordingly. Sensors are preferably incorporated into the conveyor system for providing feedback as to the speed of the conveyors to assist the processor in making the necessary adjustments to the speed of the conveyors.

For self supporting, side mounted sod harvesters, an hydraulic motor is also preferably connected in driving relationship to an outer rear wheel of the harvester to provide power to the outer rear wheel and overcome the tendency of the tractor to drift or veer toward the side of the tractor on which the harvester is mounted.

BRIEF DESCRIPTION OF THE DRAWINGS

FIG. 4 is a fragmentary front view of the cutting head mounting system.

FIG. 9a is a partially schematic representation of a drive motor of a net feeder.

FIGS. 12a-12c are schematic views showing operation of the tube feeder.

FIG. 15 is a fragmentary side view of the implement showing a towing hitch which forms a part of the hitch system in a hook-up configuration.

FIG. 16 is a view similar to FIG. 15 showing the towing hitch in a backing configuration.

DETAILED DESCRIPTION OF THE PREFERRED EMBODIMENTS

Figure 1:
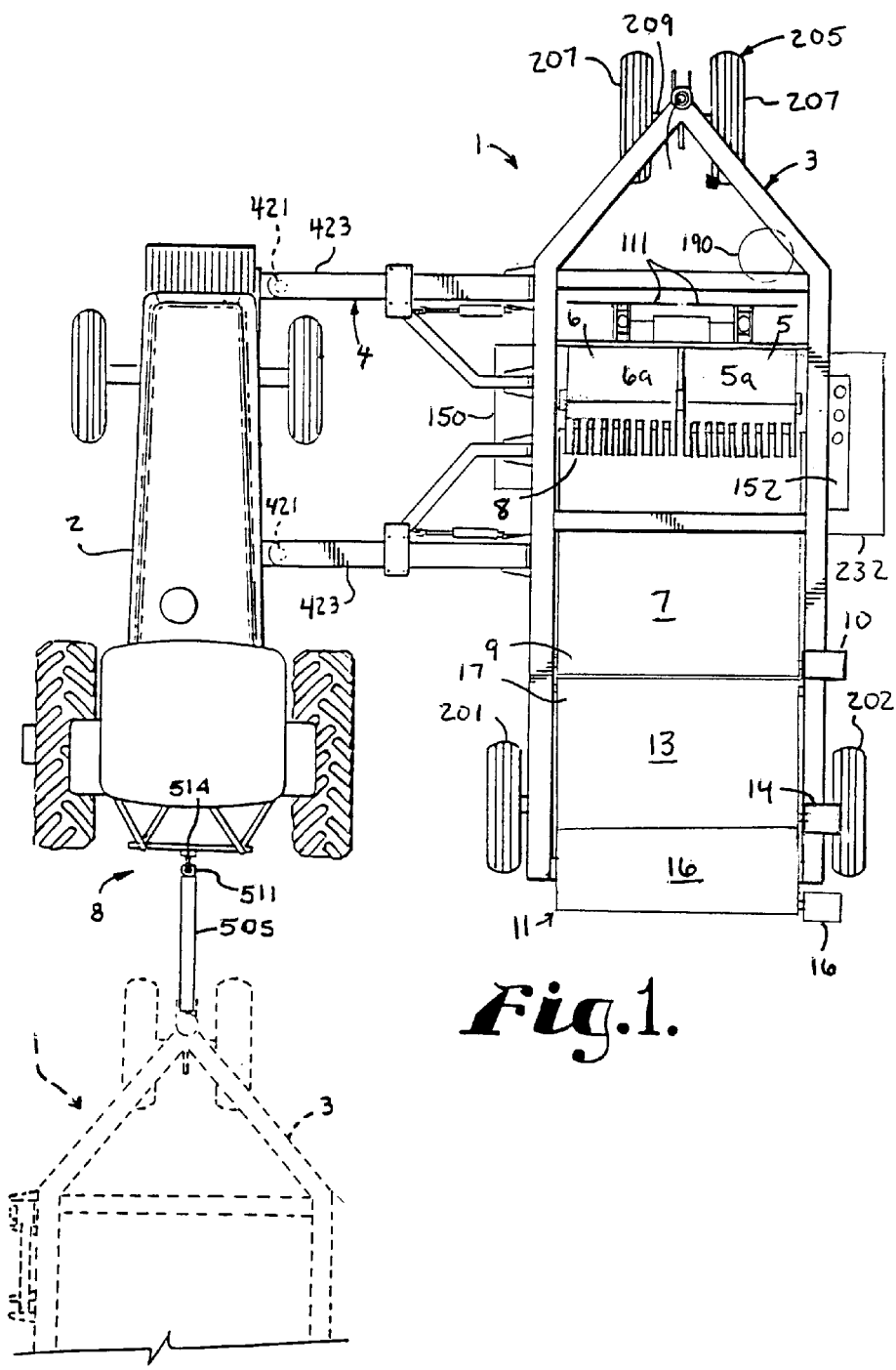
FIG. 1 is a partially schematic plan view showing a hitch system according to the present invention used to attach an implement alongside a towing vehicle.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 2:
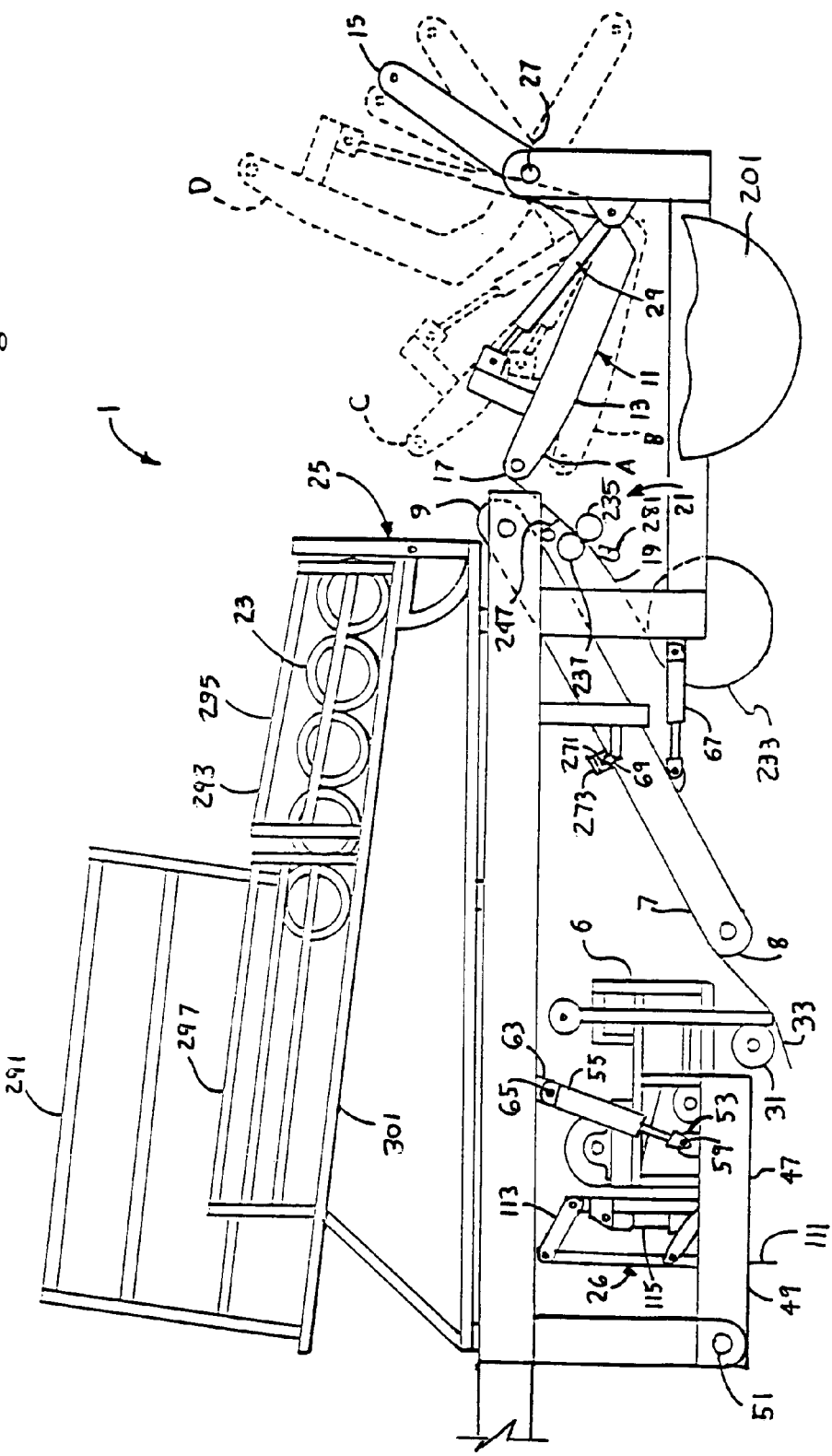
FIG. 2 is a fragmentary, partially schematic, left side view of the sod harvester as shown in FIG. 1 and showing a sod cutting head mounting system, a sod cut-off system, front and rear conveyors of a sod conveying and rolling system and also showing a tube feeder not shown in FIG. 1.
Figure 3:
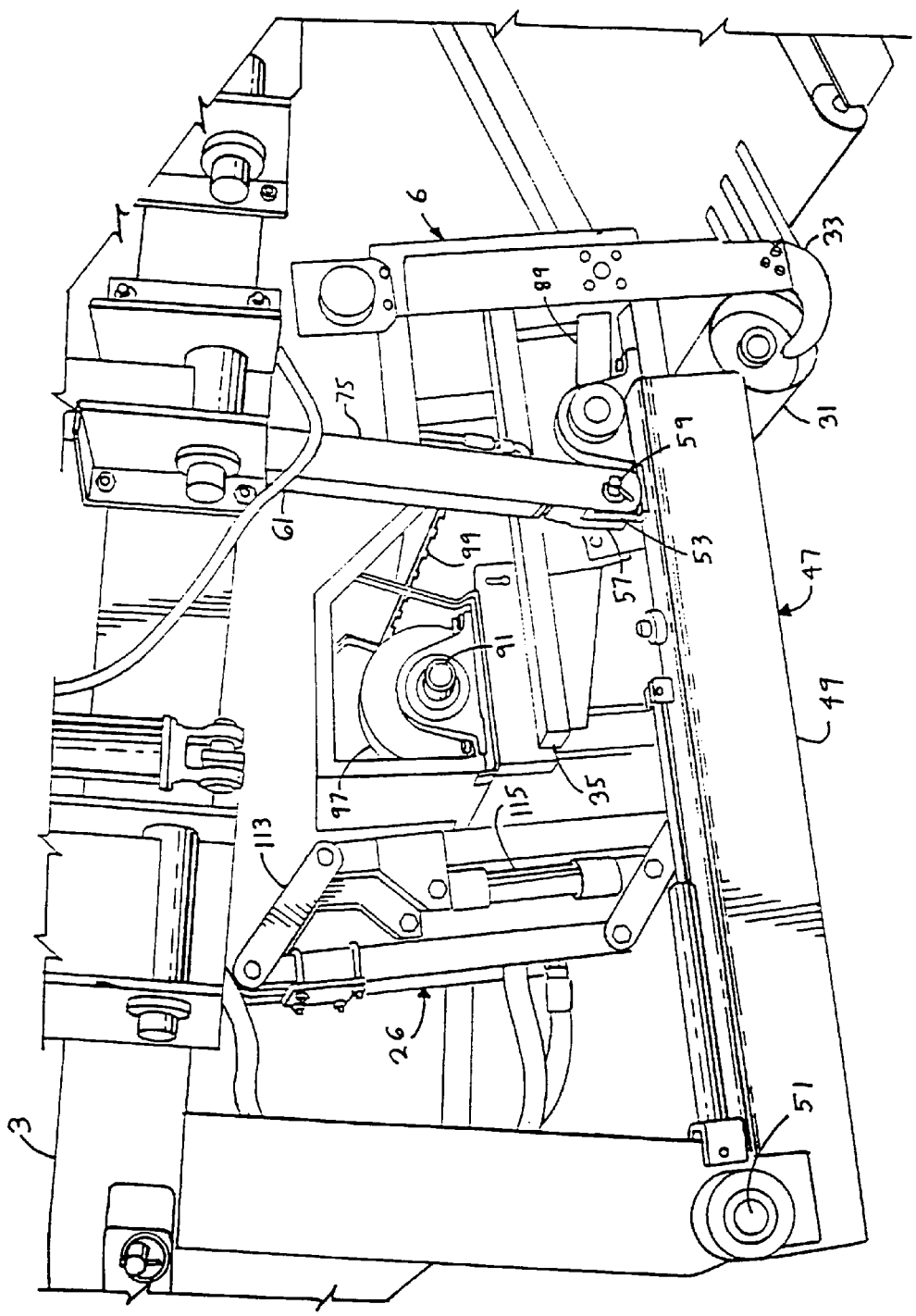
FIG. 3 is a perspective view of the cutting head mounting system.

Referring to the drawings in more detail, and in particular to FIGS. 1 and 2, the reference number 1 generally designates a large roll sod harvester incorporating features according to the present invention. The harvester 1 is shown in solid lines secured to the side of a tractor 2 in FIG. 1. The harvester 1 includes a main frame 3 which is connected to the tractor by a side hitch 4. Specifics of a hitch mounting system including the side hitch 4 are discussed in more detail hereafter.

The harvester includes a pair of laterally arrayed right and left cutting heads 5 and 6, respectively, which cut sod loose from the ground. The cutting heads are shown partially covered by shields 5a and 6a in FIG. 1. A front conveyor 7 carries the sod rearwardly and upwardly from the cutting heads 5 and 6. The front conveyor 7 has an entrance end 8 positioned proximate the cutting heads 5 and 6 and an exit end 9 and is driven by a hydraulic motor 10 which may be referred to as the front conveyor hydraulic motor 10.

The front conveyor 7 delivers the sod to a generally L-shaped rear conveyor 11 having a feed leg 13, driven by feed leg hydraulic motor 14, and a roll-forming leg 15, driven by a roll-forming leg hydraulic motor 16. The feed leg 13 of the rear conveyor 11 has an entrance end 17. Rolls of sod are formed on the rear conveyor 11 between the legs 13 and 15. The sod is carried on net or mesh 19 which is fed into the rolls along with the sod by a net feeder 21 shown diagrammatically in FIG. 2. Each roll of sod is formed around a core tube 23 which is dispensed onto the rear conveyor 11 by a tube feeder 25. A sod cut-off mechanism 26 cuts the sod to length when the sod roll reaches the desired size.

As shown in FIG. 2, the rear conveyor 11 is pivotally mounted to the main frame 3 for movement about a generally horizontal transverse axis 27 and is selectively moveable about the axis 27 by linear actuators 29 which are operatively connected to a hydraulic system of the harvester 1. The rear conveyor 11 has four operating positions: a feed position A wherein the entrance end 17 of the feed leg 13 is in general horizontal alignment with the exit end 9 of the front conveyor 7, a net starting position B wherein the entrance end 17 of the feed leg 13 is dropped below the exit end 9 of the front conveyor 7, a net cutting position C wherein the entrance end 17 of the feed leg 13 is raised above the exit end 9 of the front conveyor 7, and a dump position D wherein the rear conveyor 11 is tipped over rearwardly such that the feed leg 13 is raised into a generally vertical or past vertical orientation.

Sod Cutting Heads

Figure 4:
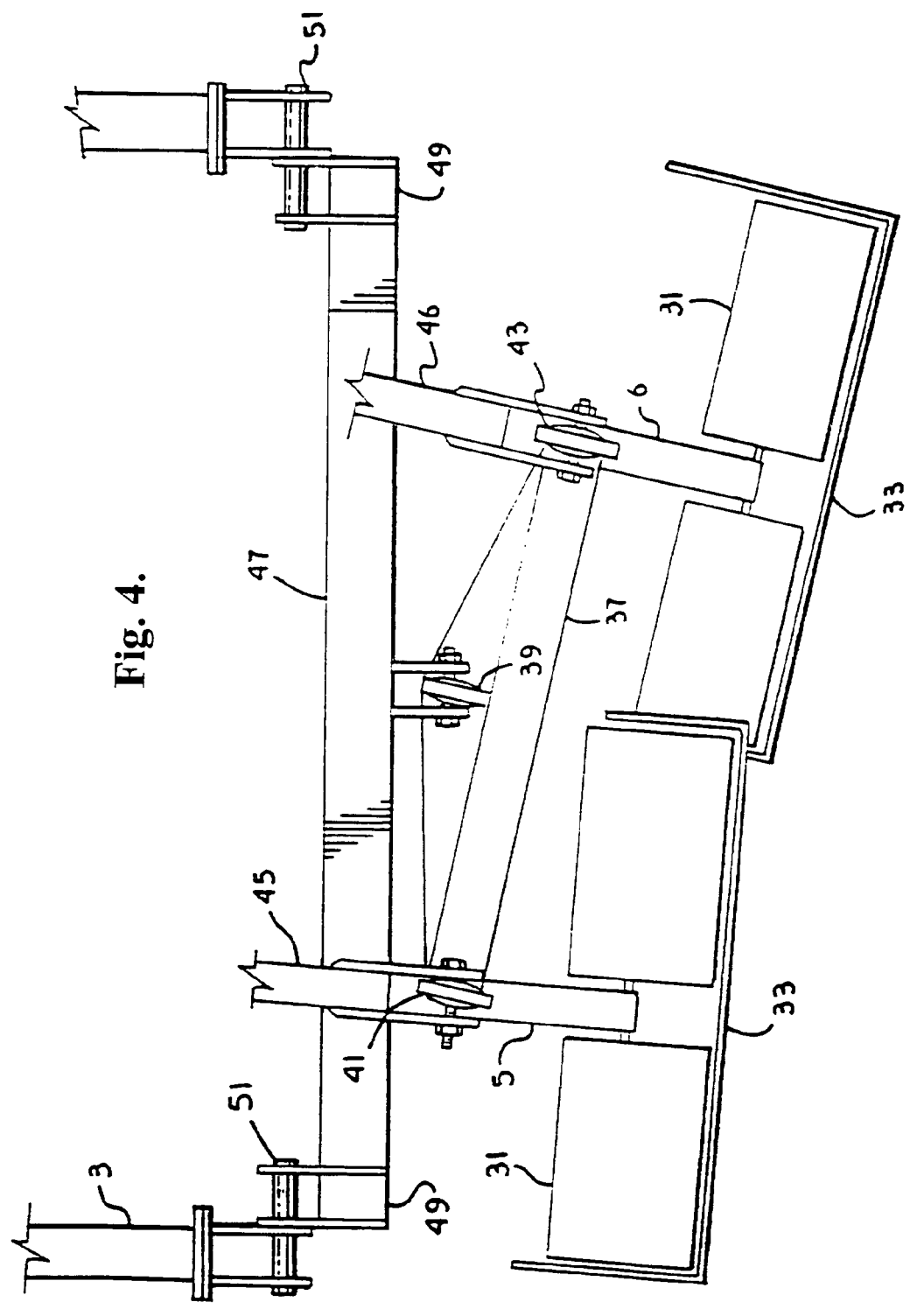

Each of the cutting heads 5 and 6 includes at least one ground engaging roller 31 and a cutting blade 33 mounted to a cutting head frame 35. Each cutting blade 33 is elongated and extends laterally slightly behind and below the respective roller 31. In operation, the cutting blades 33 will be positioned a desired depth below the surface of the soil to cut the soil and grass roots to form the sod. In order to allow the cutting heads 5 and 6 to follow the contours of the ground, the cutting head frames 35 are pivotally mounted on a pivot frame 37, generally as shown in U.S. Patents Re 34,827 and U.S. Pat. No. 5,626,195. Referring to FIG. 4, the pivot frame 37 includes a center bar 39 and right and left lateral bars 41 and 43, respectively. The right cutting head 5 is supported on a pair of depending legs 45 which are pivotally attached to the right lateral bar 41 so as to pivot about a right lateral axis defined by the right lateral bar 41. Similarly, the left cutting head 6 is supported on a pair of depending legs 46 which are pivotally attached to the left lateral bar 43 so as to pivot about a left lateral axis defined by the left lateral bar 43. Both the right lateral axis and the left lateral axis extend generally in the direction of travel of the sod harvester 1.

The center bar 39 of the pivot frame 37 is pivotally connected to a subframe 47 so as to be pivotable about a main axis defined by the center bar 39, which is also generally parallel to the direction of travel of the sod harvester 1. The subframe 47 includes a pair of longitudinal pivot arms 49, each of which is pivotally connected to the main frame 3 by a respective pivot pin 51 located proximate a forward end of the respective pivot arm 49. A pair of cross members 52 extend laterally between the pivot arms 49 and are fixedly connected to the pivot arms 49 at their opposite ends. The pivot pins 51 define a transverse pivot axis about which the subframe 47 pivots relative to the main frame 3.

Each of the pivot arms 49 further includes an upwardly extending lug 53 rearward of the respective pivot pin 51. A pair of linear actuators 55, such as double-acting hydraulic actuators, are interposed between the subframe 47 and the main frame 3. Each actuator 55 has a lower end 57 connected to a respective one of the lugs 53 by a lower pin 59 and an upper end 61 connected to a respective downwardly extending lug 63 on the main frame 3 by an upper pin 65. The actuators 55 serve two purposes. First, the actuators 55 can be extended and retracted to move the subframe 47 between a lowered position wherein the cutting heads 5 and 6 are in engagement with the ground and a transport position wherein the cutting heads 5 and 6 are raised above the ground. Second, the actuators 55 can be used to apply downward pressure to the subframe 47 when it is in the lowered position, thereby selectively increasing or decreasing the force with which the cutting heads 5 and 6 contact the ground. Downward force on the cutting heads 5 and 6 causes the rollers 31 to smooth out the sod and to hold the sod firm as it is being cut by the blades 33. This force can be selectively adjusted by varying the hydraulic pressure supplied to the actuators 55.

Referring again to FIG. 2, the front conveyor 7 is pivotally connected to the main frame 3 proximate its exit end 9 and equipped with linear actuators 67 so as to be moveable between a raised transport position and a lowered working position. When both the subframe 47 and the front conveyor 7 are in their working positions, the entrance end 8 of the front conveyor 7 is positioned in close proximity to the cutting heads 5 and 6 in order to receive the sod as it is cut. A switch or valve 69 mounted on the main frame 3 adjacent to the front conveyor 7 has a plunger 71 which is contacted by a bumper 73 on the front conveyor 7 when the front conveyor 7 reaches its working position. The switch or valve 69 controls fluid flow to the actuators 55 associated with the subframe 47. When the front conveyor 7 is lowered into its working position the plunger 71 is depressed, causing the actuators 55 to extend and lower the subframe 47 into its working position.

The subframe 47 may be selectively retained in its transport position by a pair of lock bars 75, each of which can be removably attached between one of the lower pins 59 and its respective upper pin 65. The lock bars 75 each have a length which is roughly equal to the retracted length of the actuators 55.

Figure 5:
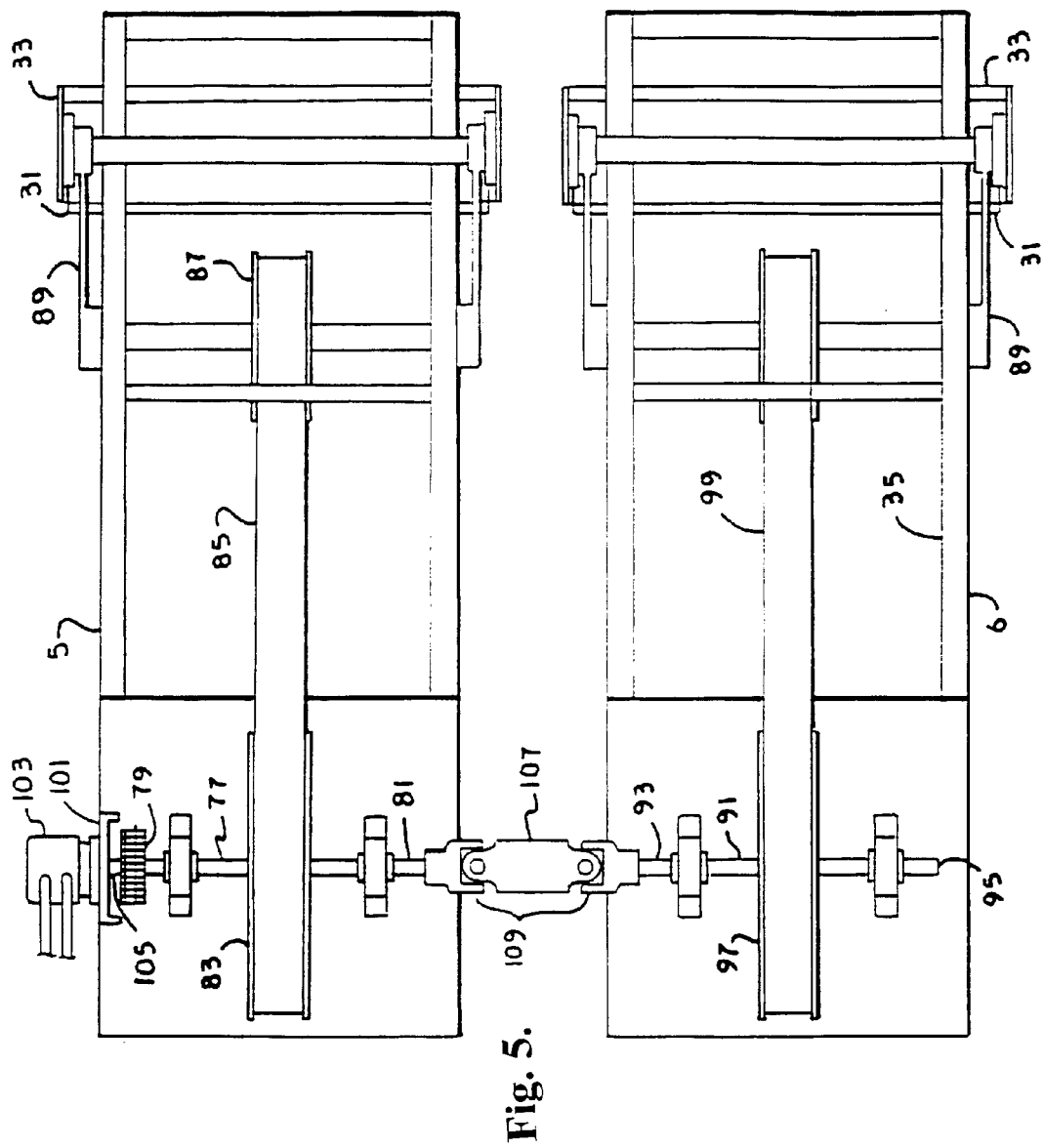
FIG. 5 is a top plan view showing the cutting heads.

Referring to FIG. 5, the right cutting head 5 includes a right input shaft 77 which is rotatably mounted to the respective cutting head frame 35 and includes first and second ends 79 and 81, respectively. Concentrically mounted on the right input shaft 77 between the first and second ends 79 and 81 thereof is a drive pulley 83 about which is entrained a cogged belt 85. The belt 85 is connected to a driven pulley 87 on an eccentric drive linkage 89 which drives the right cutting blade 33, generally as described in U.S. Patent Re 34,827. Similarly, the left cutting head 6 includes a left input shaft 91 which is rotatably mounted to the respective cutting head frame 35 and includes first and second ends 93 and 95, respectively. Connected to the left input shaft 91 is a drive pulley 97 which drives a cogged belt 99 which, in turn, drives the left cutting blade 33 through a second eccentric drive linkage 89.

The right cutting head 5 further includes a mounting flange 101 to which is mounted a hydraulic motor 103. The motor 103 includes an output shaft 105 which is operatively connected to the first end 79 of the right input shaft 77. An interconnecting drive shaft 107 is connected between the second end 81 of the right input shaft 77 and the first end 93 of the left input shaft 91. The interconnecting drive shaft 107 includes a pair of universal joints 109 which allow the shaft 107 to flex as the cutting heads 5 and 6 pivot relative to one another on the pivot frame 37. The use of the interconnecting drive shaft 107 and a single motor 103, along with the cogged drive belts 85 and 99, fixes the angular relationship between the right and left input shafts 77 and 91, respectively, thereby insuring proper timing of the cutting blades 33.

Sod Cut-Off and Conveyor Control System

Figure 6:
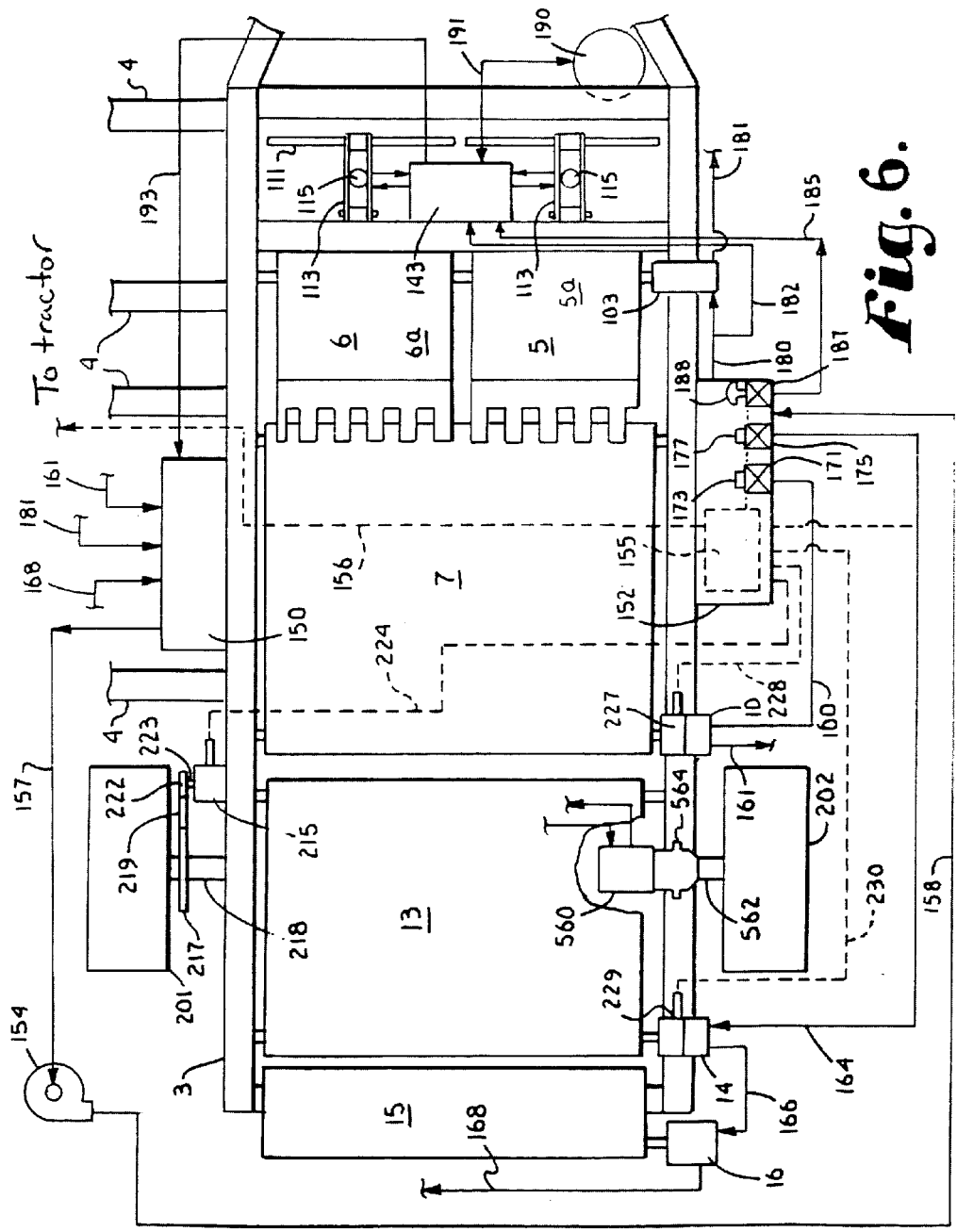
FIG. 6 is a fragmentary partially schematic, top plan view of the sod harvester showing control systems for controlling the sod cut-off system and the front and rear conveyors and with portions broken away to show a hydraulic motor assist for an outer rear wheel.
Figure 7:
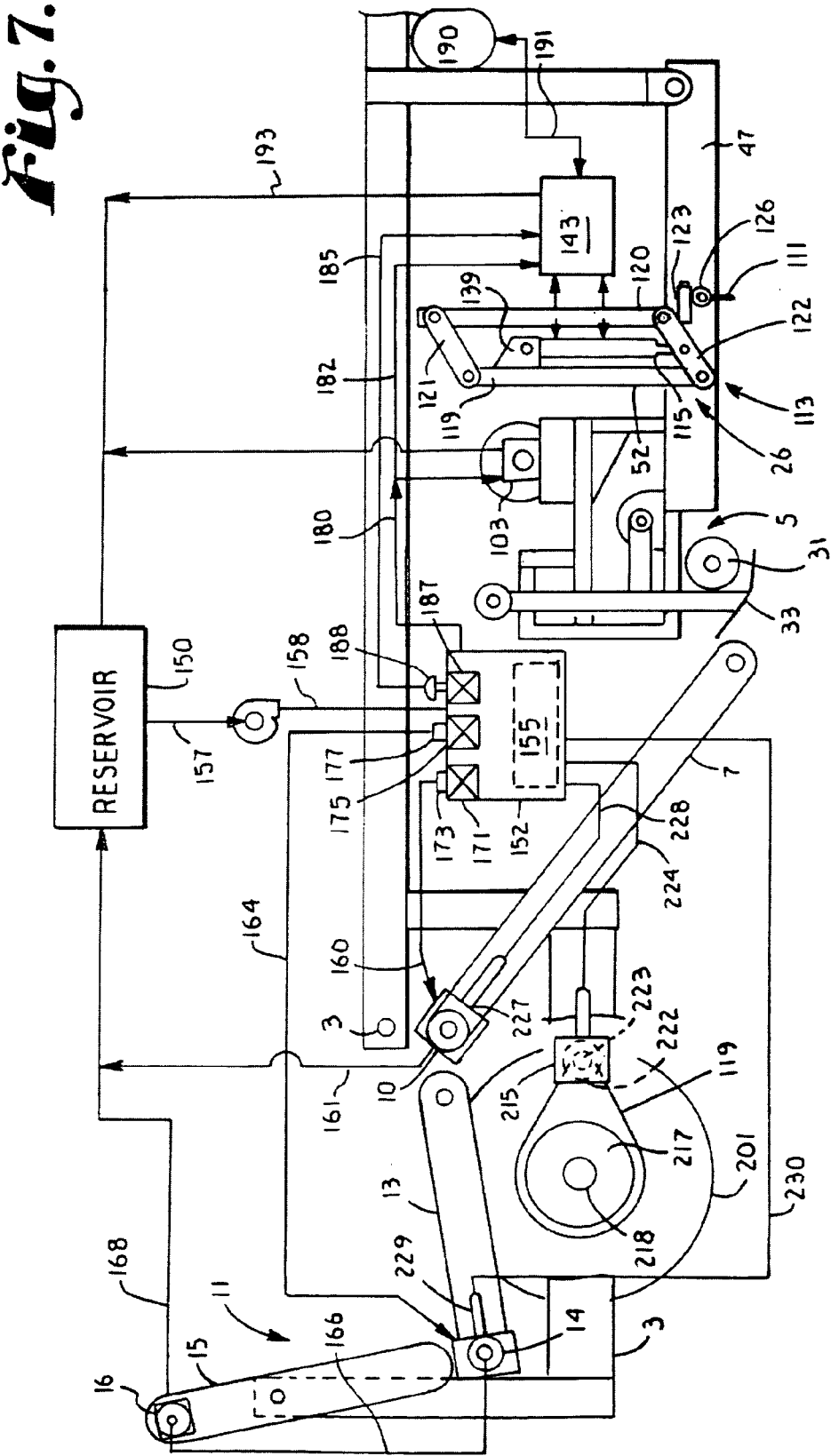
FIG. 7 is a fragmentary partially schematic, right side view of the sod harvester showing control systems for controlling the sod cut-off system and the front and rear conveyors with portions broken away to show detail thereof.
Figure 8:
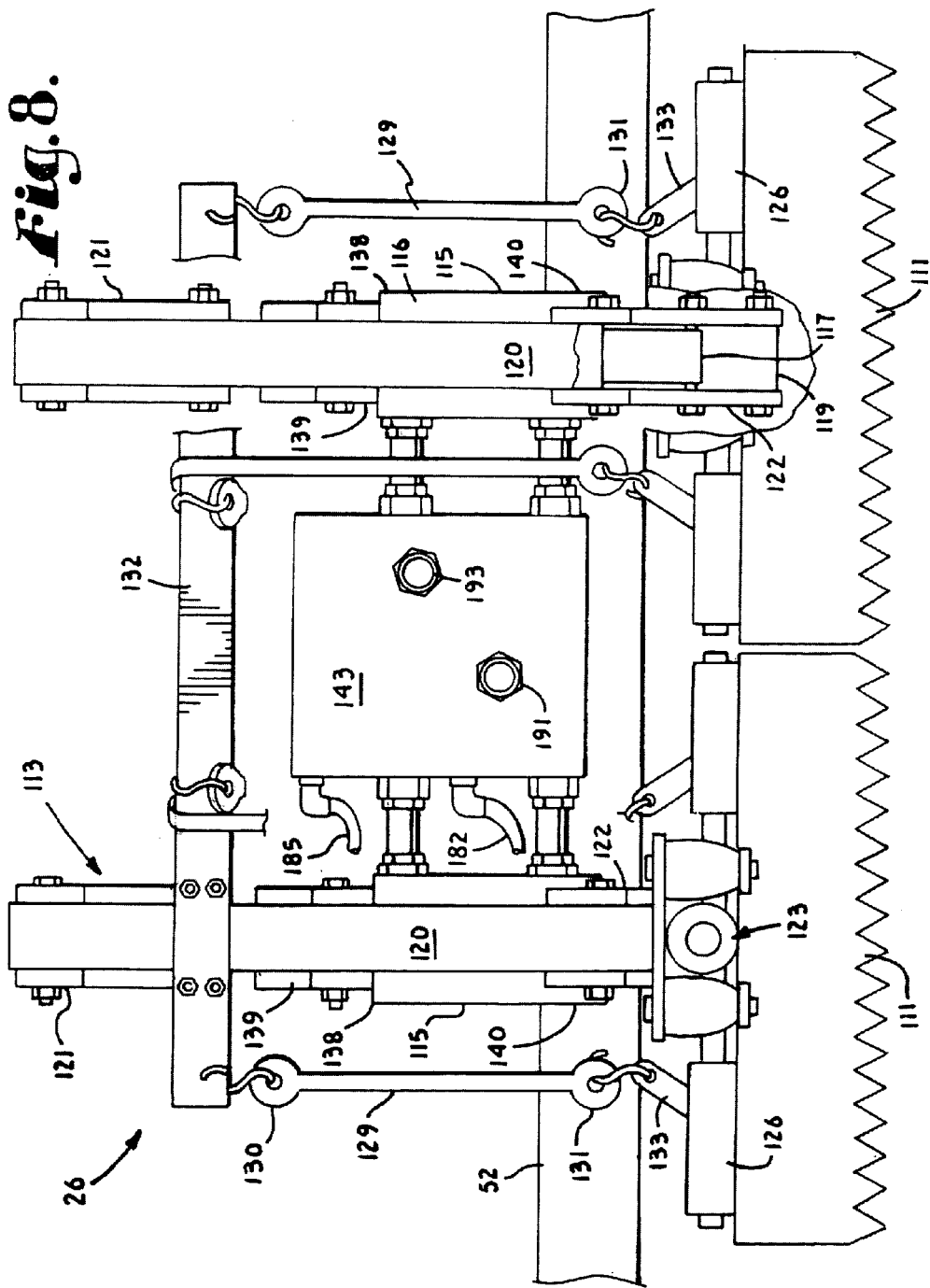
FIG. 8 is an enlarged and fragmentary front plan view of the sod cut-off system with portions broken away to show detail.

Referring to FIGS. 6-8, the sod cut-off mechanism 26 includes a pair of downwardly acting blades 111 mounted on respective parallelogram linkages 113. Each linkage 113 is equipped with a respective linear actuator 115, such as a double acting hydraulic actuator having a cylinder 116 and a piston 117, which is capable of moving the respective blade 111 downwardly to cut off the sod off at selected intervals. One blade 111, with its respective linkage 113 and actuator 115 is provided for each of the cutting heads 5 and 6. The cut-off mechanism 26 is mounted on one of the cross members 52 of the subframe 47 ahead of the cutting heads 5 and 6.

Each parallelogram linkage 113 includes a rear fixed leg 119 connected to a subframe cross member 52 and a forward vertical support member 120 connected to the fixed leg by upper and lower pivoting links 121 and 122. Each blade 111 is connected to the lower end of a respective forward vertical support member 120 by a side to side pivot assembly 123 which permits the blade 111 to pivot side to side relative to the parallelogram linkage 113, and by a hinge 126 which permit the blade 111 to pivot from front to back as the harvester 1 travels over the ground. The side to side pivoting of the blades 111 ensures a generally uniform depth of cut by the blades 111 over uneven terrain. The front to back pivoting of the blades 111 permits the knife blades 111 to pivot rearwardly after being driven into the ground by extension of the actuators 115 and as the harvester 1 continues to move forward until the knife blades 111 are pulled out of the ground upon retraction of the actuators 115.

As seen in FIG. 8, elastic cords or springs 129, each having a first and second end 130 and 131 respectively, are connected at their first ends 130 to a cross member 132 extending between the forward vertical support members 120 of the parallelogram linkages 113. The elastic cords 120 are connected at their second ends 131 to tabs 133 on the knife blades 111 under tension to pull the knife blades 111 back to a vertical alignment when pulled out of the ground.

The actuators 115 are each pivotally connected at an upper end 138 thereof to a clevis 139 connected to the rear fixed leg 119 of the respective parallelogram linkage 113. A lower end 140 of each actuator 115, which in the embodiment shown comprises the piston 117, is pivotally connected to the lower pivoting links 122 of the respective parallelogram linkage 113. The actuators 115 are dual acting, and hydraulic fluid is supplied to and from the actuators 115 through a cut-off control valve assembly 143 mounted between the actuators 115 as generally shown in FIG. 8.

FIGS. 6 and 7 comprise partially schematic views of the sod harvester showing the systems for controlling the sod cut-off mechanism 26 and the front and rear conveyors 7 and 11. As described previously, hydraulic motors and hydraulic actuators are used to drive or power the various assemblies to cut, convey and roll the sod. More specifically, cutting head hydraulic motor 103 drives the cutting heads 5 and 6 to strip the sod from the ground, front conveyor motor 10 drives the front conveyor 7 which conveys the stripped sod from the cutting heads 5 and 6 to the rear conveyor 11, hydraulic motors 14 and 16 drive the feed leg 13 and roll-forming leg 15 of the rear conveyor 11 to form the sod into a roll, and sod cut-off actuators 115 drive the cutting blades 111 to cut the strips of sod to a desired length.

Hydraulic fluid is supplied to these motors and actuators from a hydraulic fluid reservoir 150 mounted on the harvester frame 3. The hydraulic fluid is pumped to the motors and actuators through a control panel assembly 152 by one or more hydraulic pumps 154, which may be driven by the power take-off (not shown) of the tractor 2. The control panel assembly 120 includes a computer processor or controller 155 for receiving and processing signals indicative of the speed of the harvester 1 and which can compute the distance traveled by the harvester 1. The control panel assembly 120 further comprises a plurality of valves and control devices for controlling the flow of hydraulic fluid to the motors and actuators in response to instructions or control from the computer processor 155 or manual controls. Data is communicated between the processor 155 and a display and input device (not shown) in the cab of the tractor 2 via a communications link or cable 156. Cable 156 may be a bundle of cables supplying power to the processor as well as serving as the communications link.

Pump supply line 157 supplies hydraulic fluid from the reservoir 150 to the pump 154 and hydraulic fluid is then pumped to the control panel 152 by pump discharge line 158. Hydraulic fluid is supplied under pressure to the front conveyor hydraulic motor 10 from the control panel assembly 152 through front conveyor supply line 160 to drive the hydraulic motor 10. After passing through hydraulic motor 10, the hydraulic fluid is returned to the reservoir 150 through front conveyor return line 161. Hydraulic fluid is supplied to the feed leg hydraulic motor 14 from control panel assembly 152 through feed leg supply line 164. Feed leg hydraulic motor 14 is then connected in series to roll-forming leg hydraulic motor 16 by supply line branch 166. Hydraulic fluid passing through the feed leg hydraulic motor 14 and then roll-forming leg hydraulic motor 16 is returned to the reservoir through rear conveyor return line 168.

The volumetric flow rate of hydraulic fluid supplied to the front conveyor hydraulic motor 10 is controlled by a front conveyor flow control valve 171 in the control panel assembly 152 and connected to front conveyor supply line 160. The front conveyor flow control valve 171 is controlled by the controller 155 of the control panel assembly 152 based upon settings controlled by the operator on the tractor 2 communicated to the controller 155 over the communications link 156. The front conveyor flow control valve 171 may also be controlled manually using a front conveyor speed control knob 173 on the control panel assembly 152, if for example, power to the processor is lost or the communications link 156 is severed. Adjusting the front conveyor flow control valve 171 to increase or decrease the volumetric flow rate of hydraulic fluid therethrough results in a corresponding increase or decrease of the speed of the hydraulic motor 10 and of the front conveyor 7.

Similarly, a rear conveyor flow control valve 175 in control panel assembly 152 and connected to feed leg supply line 164 controls the volumetric flow rate of hydraulic fluid to the feed leg hydraulic motor 14 and the roll-forming leg hydraulic motor 16. Rear conveyor flow control valve 175 is also controlled by the controller 155 or alternatively may be manually controlled by a rear conveyor flow speed control knob 177. Adjusting the rear conveyor flow control valve 175 to increase or decrease the volumetric flow rate of hydraulic fluid therethrough results in a corresponding increase or decrease of the speed of the hydraulic motors 14 and 16, the feed leg 13, and roll-forming leg 15, respectively, of rear conveyor 11.

Hydraulic fluid is supplied to the cutting head hydraulic motor 103 by a cutting head supply line 180 extending from the control panel assembly 152. After passing through the hydraulic motor 103, the hydraulic fluid may be directed back to the reservoir 150 through a return line 181. Alternatively, the fluid may be directed back to the control panel 152 to supply hydraulic fluid to the front conveyor 10 through the valve 171 and supply line 160.

A cut-off supply branch 182 branching off of cutting head supply line 180 supplies pressurized hydraulic fluid to the cut-off control valve assembly 143. Hydraulic fluid is supplied to and from the sod cut-off actuators 115 through the valve assembly 143. The operation of the valve assembly 143 is controlled by a pilot pressure supply line 185 extending from the control panel assembly 152 to the valve assembly 143. Flow of hydraulic fluid through the pilot pressure supply line 185 is controlled by a solenoid actuated valve 187 in the control panel assembly 152 which in turn is controlled by the controller 155. The solenoid actuated valve 187 may separately be activated by a cut-off activation button 188 located on the control panel assembly 152.

The solenoid actuated valve 187 is normally closed. With the valve 187 closed, the cut-off control valve assembly 143 is in a first condition in which the actuators 115 are retracted. In the first condition of valve assembly 143, pressurized hydraulic fluid from the cut-off supply branch 182 is supplied to a first side of the actuators 115 causing them to retract and is also supplied to an accumulator 190 mounted to the harvester frame 3 near valve assembly 143 through accumulator line 191.

When the solenoid actuated valve 187 opens a pressure signal is sent to the cut-off control valve assembly 143 which changes the condition of the valve assembly to a second condition. In the second condition, the supply of hydraulic fluid from the cut-off supply branch 182 is shut-off. The first side of the actuators 115 are opened to a cut-off valve return line 193 to allow fluid to rapidly drain out of the first side of the actuators 115. Simultaneously, the second side of each actuator 115 is connected to the accumulator line 191, which supplies a pressurized charge of hydraulic fluid to the second side of each actuator 115 causing the actuators to rapidly extend, driving the cutting blades 111 downward into the ground.

The solenoid actuated valve 187 on pilot pressure supply line 185 is designed to close after sufficient time has elapsed to allow the actuators to drive the cutting blades 111 into the ground. Upon closing of the solenoid actuated valve 187, the cut-off control valve assembly 143 returns to the first condition, cutting off the flow of hydraulic fluid from the accumulator line 191 to the second side of the actuators 115, opening the supply of pressurized hydraulic fluid from the cut-off supply branch 182 to the first side of the actuators 115 and to the accumulator 190 through accumulator line 191, and opening the second side of the actuators 115 and the pilot pressure supply line 185 to the cut-off valve return line 193. Upon the return of the cut-off control valve assembly 143 to the first condition, hydraulic fluid is supplied to the first side of the actuators 115 forcing fluid out of the second side thereof to return line 193 and returning the actuators 115 to the retracted position, pulling the cutting blades 111 out of the ground. Simultaneously, the accumulator 190 is recharged through the supply of hydraulic fluid through accumulator line 191.

The computer processor 155 in the control panel assembly 152 controls the operation of valves 171, 175 and 187 and the associated hydraulic motors 10, 14 and 16 and actuators 115 in response to signals generated by sensors associated with the harvester 1. In the embodiment of the harvester 1 as shown in FIG. 1, the harvester 1 includes left and right rear wheels 201 and 202 respectively and a front dolly wheel assembly 205. The dolly wheel assembly 205 includes at least one front wheel 207 (two shown) rotatably mounted to a wheel carrier 209. The carrier 209 is, in turn, pivotally mounted to the frame 3 so as to be freely rotatable about a generally vertical pivot 211. The harvester 1 is self-supported on wheels 201, 202 and 207.

Referring again to FIGS. 6 and 7, a ground speed sensor 215 is mounted on frame 3 and operatively connected to the left rear wheel 201, or the rear wheel positioned closest to the tractor 2 when the harvester 1 is connected to the side of the tractor 2. A preferred ground speed sensor 215 comprises a speed sensor of the type used with hydraulic motors to measure the speed of the motor, and includes a pulse pickup 216 and a magnetized speed ring (not shown) rotatably mounted in a housing. The pulse pickup 216 outputs a digital pulse signal which varies in response to the rotational speed of the speed ring. Such a sensor is available from Danfoss A/S. This type of sensor has been found to be particularly well adapted for the present application due to its ability to withstand vibrations generated by the sod harvester while producing reliable measurements.

The wheel to which the sensor 215 is operatively connected, preferably is a non-driven wheel, such as left rear wheel 201. A first sprocket or gear 217 is mounted on the axle 218 of left rear wheel 201. The first sprocket 217 is connected by a chain 219 to a second sprocket 222 on a stub shaft 223. The stub shaft 223 extends into the housing of the sensor 215 and engages the speed ring. The pulse pickup 216 is mounted on the housing in position to sense the speed of rotation of the speed ring. Rotation of the wheel 201 as the harvester 1 moves along the ground is translated into rotation of stub shaft 223, the speed of which is measured by the ground speed sensor 215. The sensor 215 produces an output signal corresponding to the speed of the stub shaft 223. The output signal is transmitted over cable 224 to the processor 155 in the control panel assembly 152 which uses this information to calculate the speed of and distance traveled by the harvester 1.

A front conveyor speed sensor 227 is connected to the front conveyor hydraulic motor 10 to measure the rotational speed of an output shaft of hydraulic motor 10. An output signal from the sensor 227 is transmitted over cable 228 to the processor 155 which uses the information to calculate the speed of the front conveyor 7. Similarly, a rear conveyor speed sensor 229 is connected to the feed leg hydraulic motor 14 to measure the rotational speed of an output shaft of the feed leg hydraulic motor 14. An output signal from the sensor 229 is transmitted over cable 230 to the processor 155 which uses the information to calculate the speed of the feed leg 13 and roll-forming leg 15 of the rear conveyor 7.

The processor 155 is programmed to adjust the speed of the front and rear conveyors 7 and 11 relative to the speed of the harvester 1, as sensed by the ground speed sensor 215, by controlling the flowrate of hydraulic fluid to the front conveyor hydraulic motor 10 and the feed leg hydraulic motor 14 respectively. The processor 155 may be programmed or set to normally attempt to match the speed of the front and rear conveyors 7 and 11 to the ground speed so that the conveyors 7 and 11 cause the sod to be formed into a roll at the same rate that the sod is cut or stripped from the ground. The speed of the front and rear conveyors 7 and 11 relative to the harvester ground speed can be adjusted by an operator in the tractor cab using an input device linked to the controller 155 or manually, using control knobs 173 and 177, by an operator positioned on a platform 232 secured to the harvester frame 3 near the control panel assembly 152. For example, an operator may want to increase the speed of the front and rear conveyors 7 and 11 or only the rear conveyors 11 to be slightly greater than the harvester ground speed to place the strips of sod harvested under a slight amount of tension to result in tighter rolls of sod being formed. The use of the controller 155 to control the speed of the conveyors 7 and 11 relative to the ground speed, reduces the need for an operator to constantly monitor the speed at which the sod is being harvested and make corresponding adjustments to the speed of the conveyors 7 and 11.

As discussed previously, the signal from the ground speed sensor 215 can also be utilized by the processor 155 to calculate the distance traveled by the harvester 1 and the length of a strip of sod cut thereby. This information can then be used by the processor 155 to determine when the sod cut-off mechanism 26 should be activated to cut the strip of sod to the desired length. When the processor 155 determines from the information provided by the ground speed sensor 215 that the harvester 1 has traveled the distance corresponding to the length of a strip of sod to be harvested, the processor 155 sends a signal opening the solenoid actuated valve 187 on pilot pressure supply line 185 sending a pressure signal to the cut-off control valve assembly 143 causing the actuators 115 to extend, driving the cutting blades 111 into the ground and cutting the strip of sod to the desired length. Using the input device linked to the controller 155, an operator may selectively vary the distance to be traveled by the harvester 1 to activate the sod cut-off mechanism 26 without having to make any mechanical adjustments thereto. The cut-off activation button 188 may be used by an operator on the platform 232 to manually cut the strip of sod to a selected length, if for example, power to the processor is lost.

Net and Tube Feeder

Referring to FIG. 2, the net feeder 21 is generally located beneath the exit end 9 of the front conveyor 7 and includes a transverse supply roll 233 from which the net 19 is dispensed. Mounted above the supply roll 233 are first and second transverse feed rollers 235 and 237, respectively, between which the net 19 passes. The first feed roller 235 is rotatably mounted to the frame 3 in a fixed position and selectively driven by a hydraulic motor 239 acting through a chain 240 and sprag clutch or one-way bearing 241 (see FIG. 9a). The second feed roller 237 is rotatably and moveably mounted to the frame 3 for movement toward and away from the first feed roller 235. An over-center latch mechanism 242 allows the second feed roller 237 to be drawn toward and clamped against the first feed roller 235, capturing the net 19 therebetween.

The hydraulic motor 239 driving the first feed roller 235 is controlled by a valve 243 which is mounted on the frame 3. The valve 243 has a plunger 245 which is engaged and depressed by the feed leg 13 of the rear conveyor 11 when the rear conveyor 11 moves into its net feeding position. When the plunger 245 is depressed, the motor 239 is engaged, rotating the feed rollers 235 and 237. Rotation of the feed rollers 235 and 237 causes a length of the net 19 to be pulled off the supply roll 233 and ejected onto the feed leg 13 of the rear conveyor 11. The motor 239 stops when the rear conveyor 11 is moved out of its net feeding position and back into its feed position, thereby releasing the plunger 245. The rear conveyor 11 preferably remains in the net feeding position long enough for approximately one foot of the net 19 to be dispensed.

Pivotally mounted to the frame 3 above the feed rollers 235 and 237 is a net cutoff knife 247. The knife 247 comprises a knife shaft 249 and a blade 251 which is secured to the shaft 249 and extends tangentially outward therefrom. The blade 251 includes an sharpened distal edge 253. The knife 247 is pivotable between a retracted position wherein the edge 253 is angled rearwardly away from the net 19 and a cutting position wherein the edge 253 is brought into engagement with the net 19.

Figure 9:
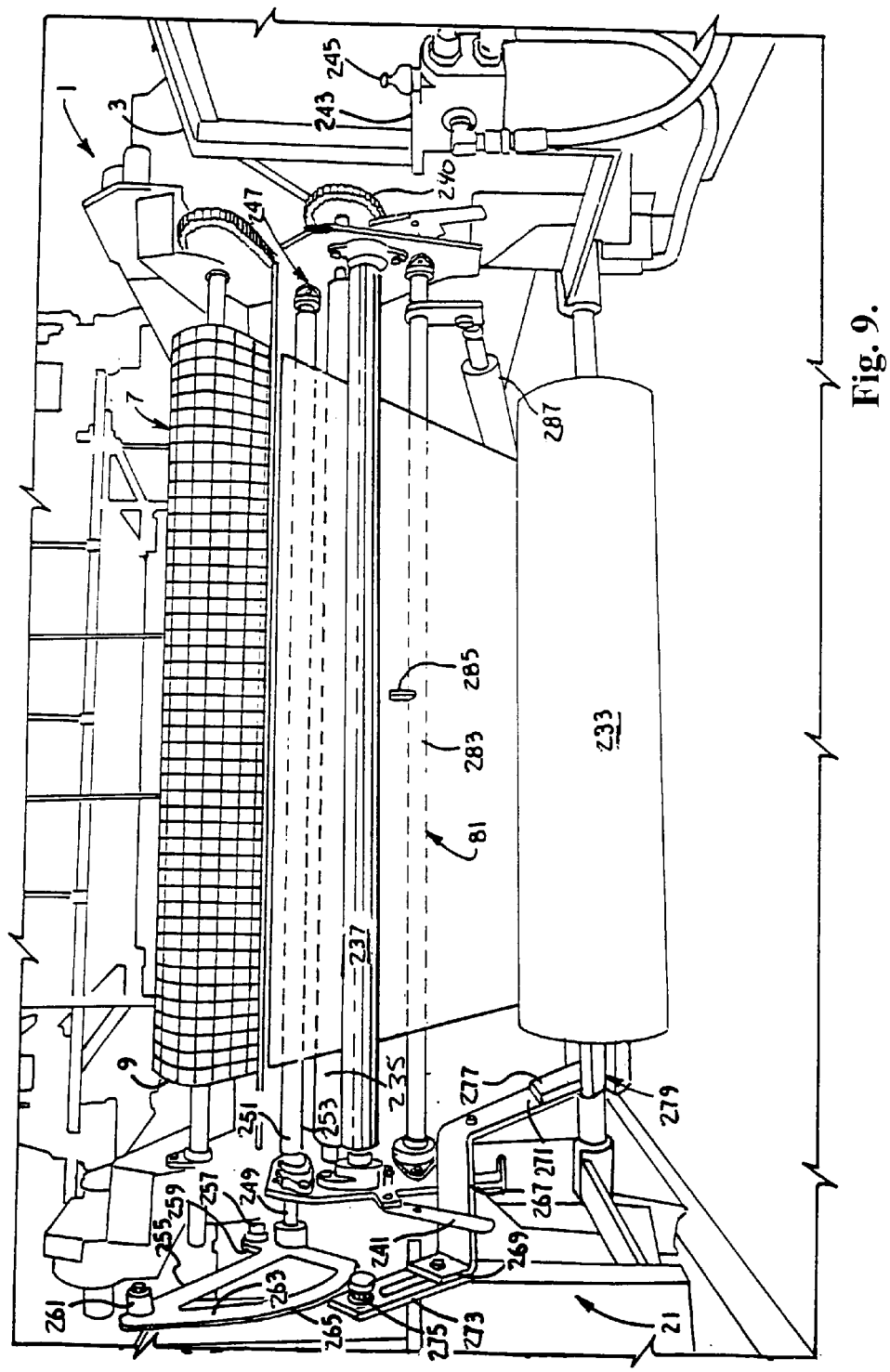
FIG. 9 is a perspective view of the sod harvester of FIG. 2 as seen from a position just behind the front conveyor thereof.
Figure 9:
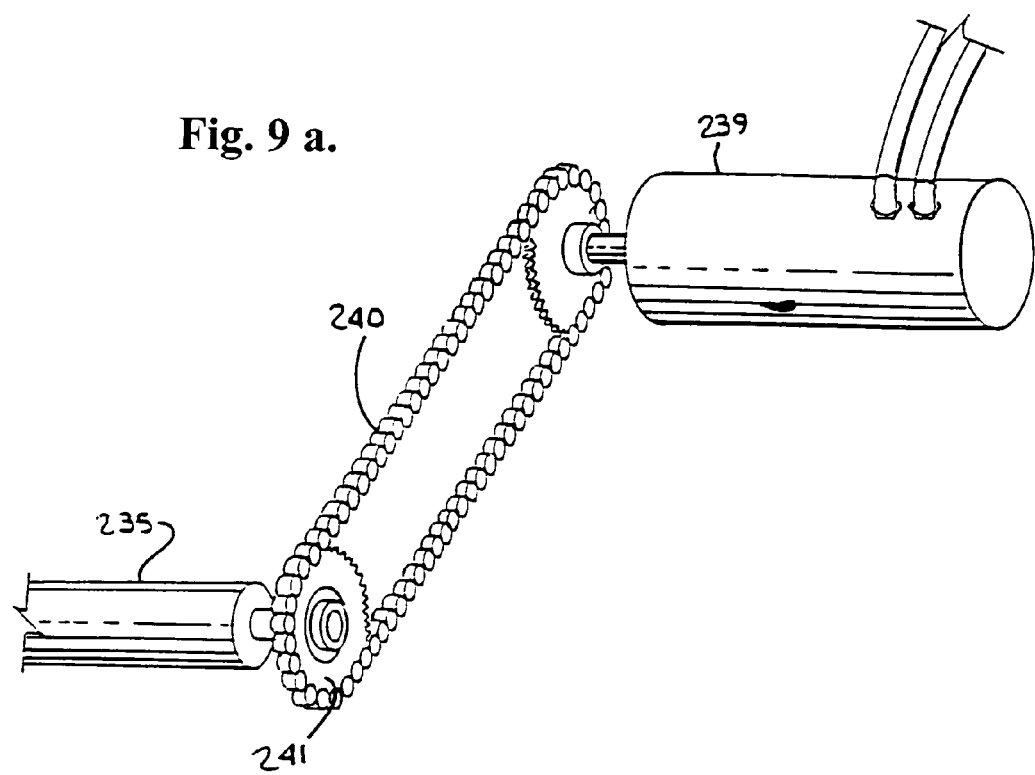
Figure 10:
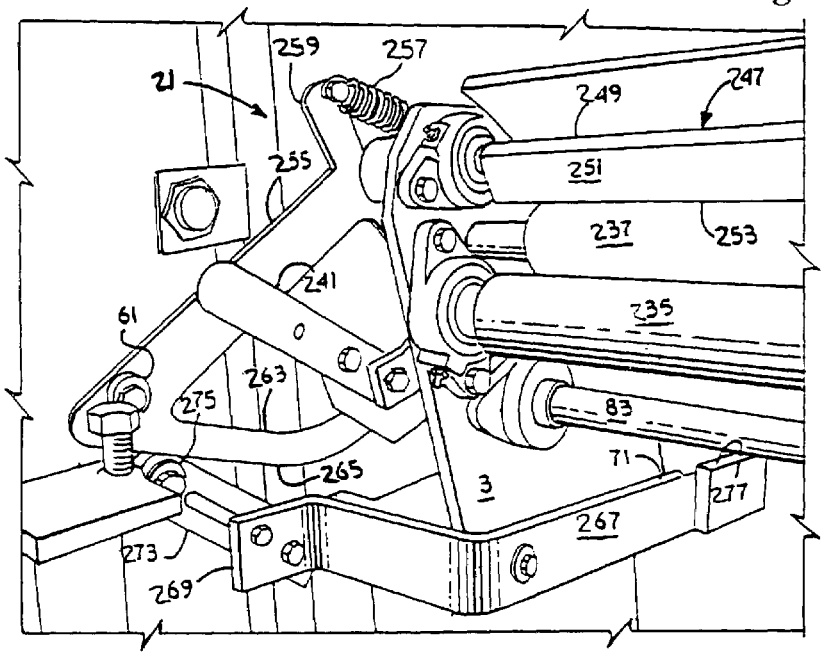
FIG. 10 is a fragmentary perspective view of the net feeder.

Referring to FIG. 10, movement of the knife 247 is controlled by a lever arm 255 which extends radially outward from the shaft 249 and rearwardly therefrom. The knife 247 is urged into the cutting position by an extension spring 257 connected between the frame 3 and a lug 259 on the lever arm 255. A roller 261 mounted proximate the distal end of the arm 255 is engageable by the feed leg 213 of the rear conveyor 11. When the rear conveyor 11 is in its feed position or net starting position, the feed leg 13 acts downwardly on the lever arm 255 and counters the action of the spring 257 to move the knife 247 into its retracted position (see FIG. 10). When the rear conveyor 11 moves upwardly into its net cutting position, pressure on the lever arm 255 is relaxed and the spring 257 acts to move the knife 247 into its cutting position (see FIG. 9).

Connected to the lower edge of the lever arm 255 is an arcuate member 263 having a cam surface 265 formed by its lower edge. A stop bar 267 is pivotally connected to the frame 3 above the supply roll 233 and below the feed rollers 235 and 237. The stop bar 267 has opposed first and second ends 269 and 271, respectively. Selectively slidably mounted to the first end 269 of the stop bar 267 is an adjustable carrier 273 which carries a roller follower 275. The roller follower 275 rollingly engages the cam surface 265 of the arcuate member 263. The second end 271 of the stop bar 267 includes a pawl 277 which is engageable with a ratchet 279 on the supply roll 233 having radially extending teeth or fins 280. The stop bar 267 is balanced such that the second end 271 is urged downwardly by its own weight. As the rear conveyor 11 moves between its various positions, the lever arm 255 also moves, causing the roller follower 275 to move along the cam surface 265 of the arcuate member 263.

The arcuate member 263 is shaped such that the ratchet pawl 277 is held upwardly, away from the ratchet 279, when the rear conveyor 11 is in its feed position or net starting position (see FIG. 10), but as the rear conveyor 11 moves upwardly into its net cutting position, the first end 269 of the stop bar 267 pivots downwardly until the pawl 277 engages one of the teeth 280 and thereby locks the supply roll 233 (see FIG. 9). As will be explained in more detail later, this causes the net 19 to be pulled tightly against the sharpened edge 253 of the knife 247, cutting the net 19.

Referring again to FIG. 9, a net splitter 281 mounted below the feed rollers 235 and 237 includes a transverse net splitter shaft 283 pivotally mounted to the frame 3 and a blade 285 which extends perpendicularly outward from the shaft 283 proximate a midline of the conveyors 7 and 11. The shaft 283 is pivotable between a cutting position wherein the blade 285 is in engagement with the net 19 and a retracted position wherein the blade 285 is clear of the net 19. The shaft 283 is selectively pivoted by a linear actuator 287 mounted between the frame 3 and a lever arm 289 extending radially outwardly from the shaft 283 proximate one end thereof. The net splitter 281 allows the operator to selectively form two half-width rolls of sod instead of a single full-width roll by splitting the net 19 in two. Pairs of half-length core tubes (not shown) are used in place of the full length tubes 23 when half-width rolls are desired. The sod itself does not need to be split since each of the cutting heads 5 and 6 naturally produces a respective strip of sod and only the net 19 and tube 23 normally hold the two strips together to form a single full-width roll.

Figure 11:
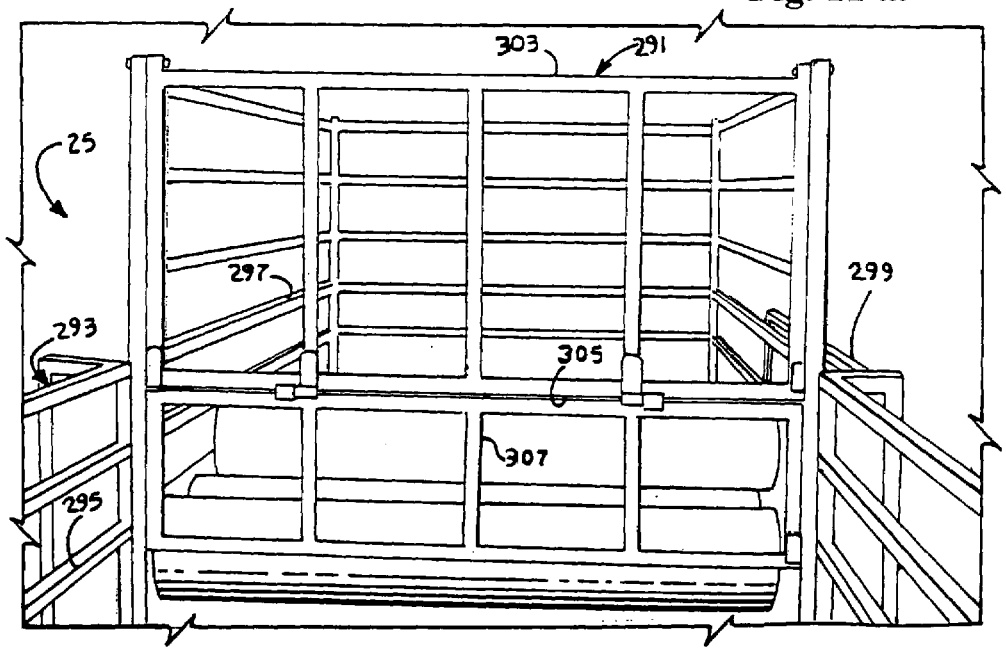
FIGS. 11a-11c are fragmentary perspective views of a core tube feeder.
Figure 11:
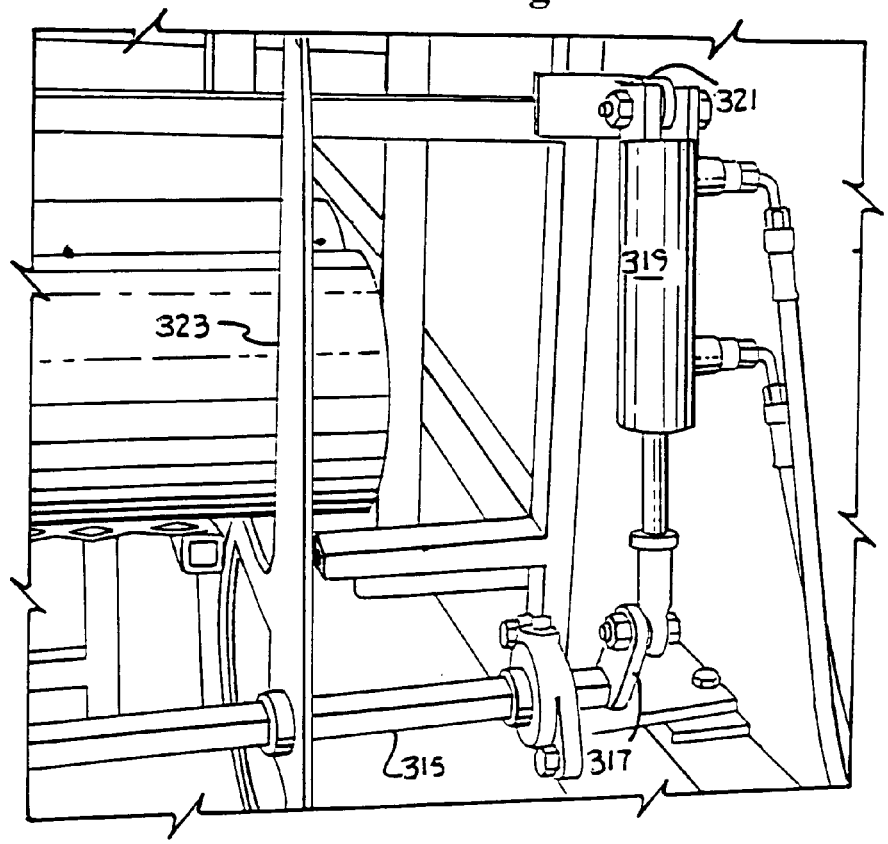
Figure 11:
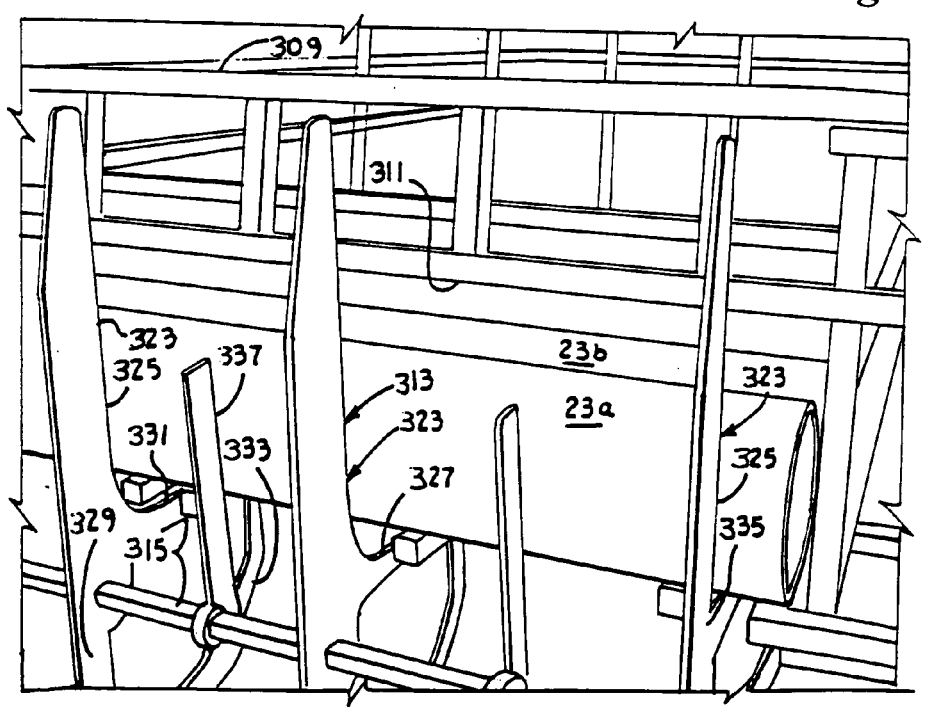

Referring to FIG. 11a-c, the tube feeder 25 is mounted above the front conveyor 7 and includes a removable rack 291 and a fixed rack 293. Both racks 291 and 293 may be constructed of square steel tubing. The fixed rack 293 has a forward compartment 295 and a rearward compartment 297. The removable rack 291 generally comprises a box sized to hold a plurality of core tubes 23, for example sixty tubes 23. The forward compartment 295 of the fixed rack 293 is sized to receive the removable rack 291 and serves as a docking station for the removable rack 291. The forward compartment 295 includes a side gate 299 through which the removable rack 291 can be removed and inserted using a forklift (not shown). The removable nature of the rack 291 allows it to be lowered to ground level for ease of loading with core tubes 23. Once loaded, the removable rack 291 is then lifted by the forklift and reinserted into the forward compartment 297 through the side gate 299. The side gate 299 is then closed to retain the removable rack 291.

The forward and rearward compartments 295 and 297 of the fixed rack 293 share a floor 301 which slopes downwardly from front to rear. The removable rack 271 includes a rearward wall 303 having a discharge opening 305 positioned at its lower end. An upwardly pivotable tailgate 307 selectively covers the discharge opening 305. The discharge opening 305 is sized such that, when the tailgate 307 is open, a single layer of the core tubes 23 will roll through the discharge opening 305 and into the rearward compartment 297.

The rearward compartment 297 of the fixed rack 293 includes a rear wall 309 having an opening 311 equipped with a tube dispenser 313 designed to drop individual ones of the core tubes 23 onto the rear conveyor 11 at the proper intervals. The dispenser 313 includes a transverse pivot shaft 315 rotatably mounted to the fixed rack 293 below the opening 311. A lever arm 317 is connected to the pivot shaft 315 proximate one of its ends and extends radially outwardly therefrom. A linear actuator 319, such as a double acting hydraulic cylinder or actuator, is connected between lever arm 317 and a lug 321 extending outwardly from the fixed rack 293. The actuator 319 is operable to rotate the pivot shaft 315 between a home position and a tube drop position.

Laterally spaced along the pivot shaft 315 are a plurality of distributing plates 323. Each distributing plate 323 includes a finger 325 which extends generally radially outward from the pivot shaft 315 and a heel 327. The heel 327 of each distributing plate 323 includes a bottom bar 329 which extends opposite the respective finger 325 and a top bar 331 which is generally perpendicular to the respective finger 325. The bottom bar 329 and top bar 331 of each heel 327 are connected by an arcuate bumper 333. A tube cradle 335 is defined by the fingers 325 and top bars 331 of the distributing plates 323. Interposed between the distributing plates 323 are respective short arms 337 which are generally in alignment with the fingers 325.

Referring to FIG. 12a, when the pivot shaft 315 is in the home position the fingers 325 are pointed upwardly and the top bars 331 of the heels 327 are positioned below the floor 301. Due to the slope of the floor 301, any core tubes 23 located in the rearward compartment 297 of the fixed rack 293 will roll rearwardly until a rearwardmost core tube 23a of the core tubes 23 is abutted against the fingers 325. When the actuator 319 begins to extend, as in FIG. 12b, the fingers 325 will begin to move downwardly and the top bars 331 will begin to move upwardly, thereby urging the rearwardmost core tube 23a into the tube cradle 335. Simultaneously, the bumper 333 will engage a second most rearward core tube 23b of the core tubes 23 and prevent it from rolling rearwardly. Referring to FIG. 12c, when the pivot shaft 315 reaches the tube drop position, the fingers 325 become downwardly and rearwardly sloped such that the core tube 23a will roll out of the tube cradle 335 and down the fingers 325 until it drops off the ends fingers 325 and onto the rear conveyor 11. The pivot shaft 315 is then returned to the home position by retraction of the actuator 319. Once the top bars 331 drop below the floor 301 the core tube 23b will roll up against the fingers 325 and will remain there until such time as the process is repeated.

In order to start a roll of sod, the rear conveyor 11 is pivoted downwardly into its net starting position. The feed leg 13 contacts the plunger 245, opening the valve 243 and causing the motor 239 to turn the first feed roller 235 and thereby advance approximately one foot of net 19 onto the feed leg 13 of the rear conveyor 11. Simultaneously, the rear conveyor 11 is started so that the net 19 is drawn flat onto the conveyor 11. The rear conveyor 11 then stops and tips upwardly into the feed position, releasing the plunger 245 and closing the valve 243 such that rotation of the motor 239 ceases.

When the rear conveyor 11 reaches the feed position a conveyor position sensor (not shown) sends a signal to the controller 155, causing the controller 155 to extend the actuator 319 on the tube dispenser 313 to pivot the fingers 325 downwardly, thereby dropping a core tube 23 onto the feed leg 13. After the core tube 23 drops and the pivot shaft 315 reaches its drop position and, a pivot shaft sensor (not shown) sends a signal to the controller 155 which then retracts the actuator 319, moving the pivot shaft 315 back into the home position and the fingers 325 into an upward orientation.

At this point in the cycle, both the front conveyor 7 and rear conveyor 11 are started and the harvester 1 is advanced to cut a strip of sod. The sod comes off the front conveyor 7 and onto the rear conveyor 11 on top of the net 19. The net 19 and sod are both advanced by the action of the feed leg 13 of the rear conveyor 11. The sprag clutch 241 allows the feed rollers 235 and 237 to freewheel as the net 19 is pulled through them, without resistance from the then inactive motor 239. The roll forming leg 15 turns the sod and net 19 upwardly such that they both wrap around the core tube 23 to form a roll. The sod continues to feed onto the rear conveyor 11 and into the roll until a predetermined length of sod is accumulated and a cut end of the sod reaches the exit end 9 of the front conveyor 7. The sod is cut or stripped from the ground by the cutting heads 5 and 6 and cut to length by the sod cut-off mechanism 26 described previously. At this time, forward progress of the harvester 1 is halted and both the front conveyor 7 and rear conveyor 11 are stopped.

In order to wrap the sod roll in net 19, the rear conveyor 11 only is restarted, for 1-2 revolutions rotating the sod roll 11 and pulling additional net onto the sod roll. The rear conveyor then stops and is pivoted upwardly into its net cutting position. As this happens, the knife 247 pivots into its cutting position and the ratchet pawl 277 engages one of the teeth 280 of the ratchet 279 to stop rotation of the net supply roll 233. With the supply roll 233 locked and the feed leg 13 of the rear conveyor 11 tipping upwardly, the net 19 is pulled tightly across the cutting edge 253 of the knife 247 and thereby severed. The rear conveyor is then restarted briefly to wrap the loose end of the net 19 onto the sod roll. When the sod roll is completely wrapped, the rear conveyor 11 stops and is then pivoted upwardly into the dumping position, causing the sod roll to be deposited over the end of the roll forming leg 15 and to the rear of the harvester 1. In order to move the sod roll out of the way of the next pass of the harvester 1, a cart (not shown) having a turntable thereon may be hitched behind the harvester 1 to catch the sod rolls as they come off of the rear conveyor 11 and turn them ninety degrees about a vertical axis. The sod rolls can then be dumped off the outboard side the cart such that they roll away from the remaining uncut sod.

Once the sod roll is dumped, the rear conveyor moves back into its net starting position and the process is repeated for the next sod roll. All of the movements of the rear conveyor 11 and other components of the harvester 1 may be automatically controlled such that the cutting and baling process takes place with minimal input from the operator.

Hitch System

Referring to FIG. 1, the reference number 501 generally designates a hitch system according to the present invention incorporating the side hitch 4 for connecting the sod harvester 1 to a towing vehicle, such as tractor 2. The hitch system 1 is used to releasably attach an implement, such as the sod harvester 1 alongside the towing vehicle 2 (which will be described and depicted herein as a conventional farm tractor) for use in the field, and further allows the harvester 1 to be towed behind the tractor 2 for road transport. The hitch system 1 generally includes the side hitch 4 and a towing hitch 408.

As noted previously, the harvester 1 includes a frame 3 and a pair of laterally spaced left and right rear wheels 201 and 202 and a front dolly wheel assembly 205. The dolly wheel assembly 205 includes at least one front wheel 207 (two shown) rotatably mounted to a wheel carrier 209. The carrier 209 is, in turn, pivotally mounted to the frame 3 so as to be freely rotatable about a generally vertical pivot 211. The harvester is self-supported on wheels 201, 202 and 207.

The side hitch 4 includes a pair of longitudinally spaced hitch balls 421 mounted on a side of the tractor 2 and a pair of hitch arms 423 mounted on a corresponding side of the implement frame 3. The arms 423 are pivotable about a generally horizontal axis and carry hitch couplers 425 which are engageable with the hitch balls 421.

Figure 13:
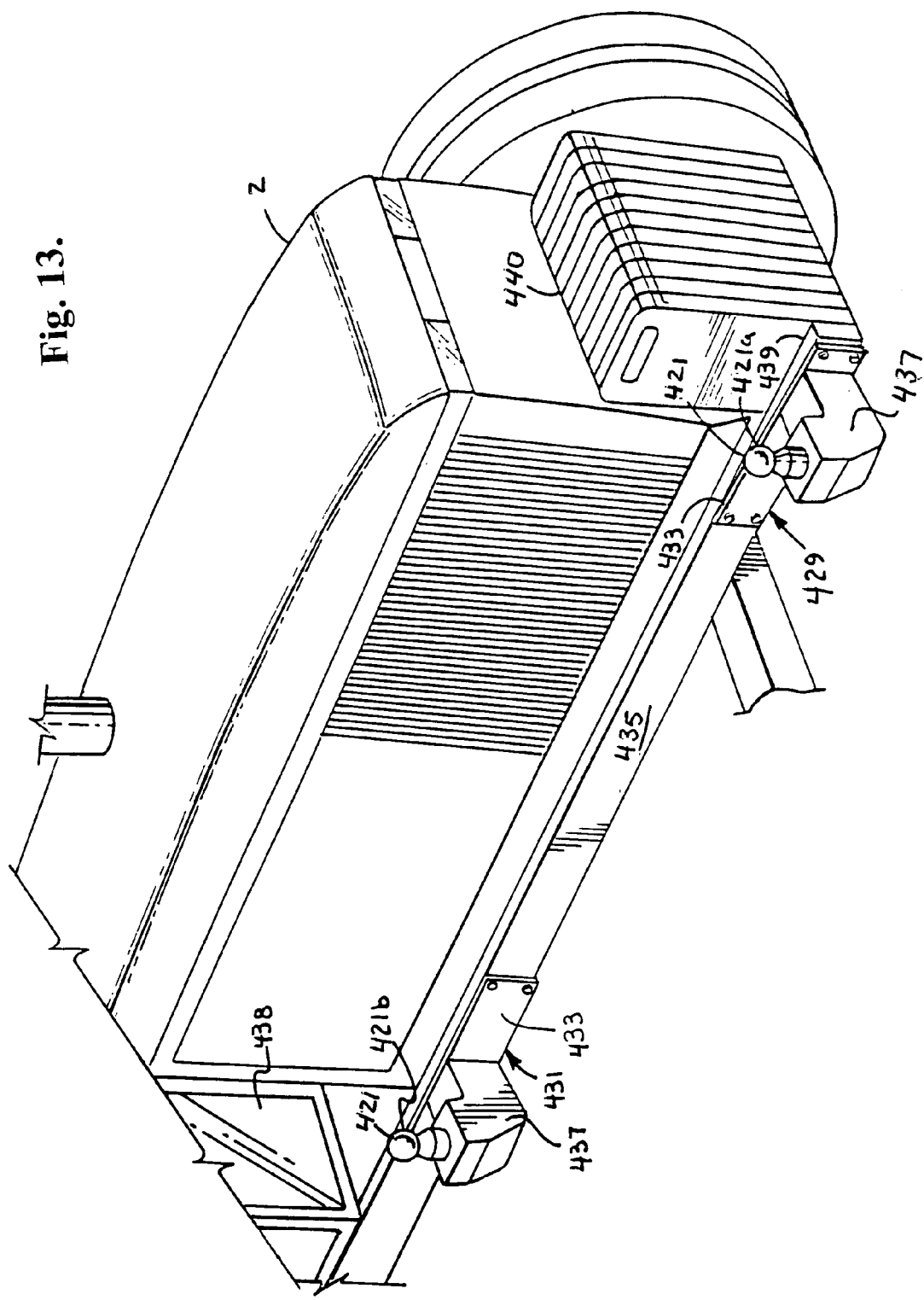
FIG. 13 is a perspective view of the towing vehicle showing the mounting of a pair of hitch balls which form a part of the hitch system.

Referring to FIG. 13, the hitch balls 421 include a forward hitch ball 421a and a rearward hitch ball 421b which are attached to the tractor 2 by respective brackets 429 and 431. Each of the brackets 429 and 431 comprises a backing plate 433 adapted to be bolted or otherwise secured to a side frame member 435 of the tractor 2 and an outwardly extending perch 437 which supports the respective hitch ball 421 in an upwardly oriented position. The forward hitch ball 421a and its bracket 429 are preferably fastened to the tractor 2 proximate the front of the tractor 2 while the rearward hitch ball 421b and its bracket 431 are mounted just forward of the tractor cab 438 or operator's station. An extension 439 may be used to space the forward hitch ball 421a forward of the end of the side frame member 435, such as alongside the tractor's weight rack 440. If the tractor frame tapers inwardly toward the front of the tractor, the extension 439 may also be wedge shaped to space the forward hitch ball 421a outwardly and into longitudinal alignment with the rearward hitch ball 421b.

Figure 14:
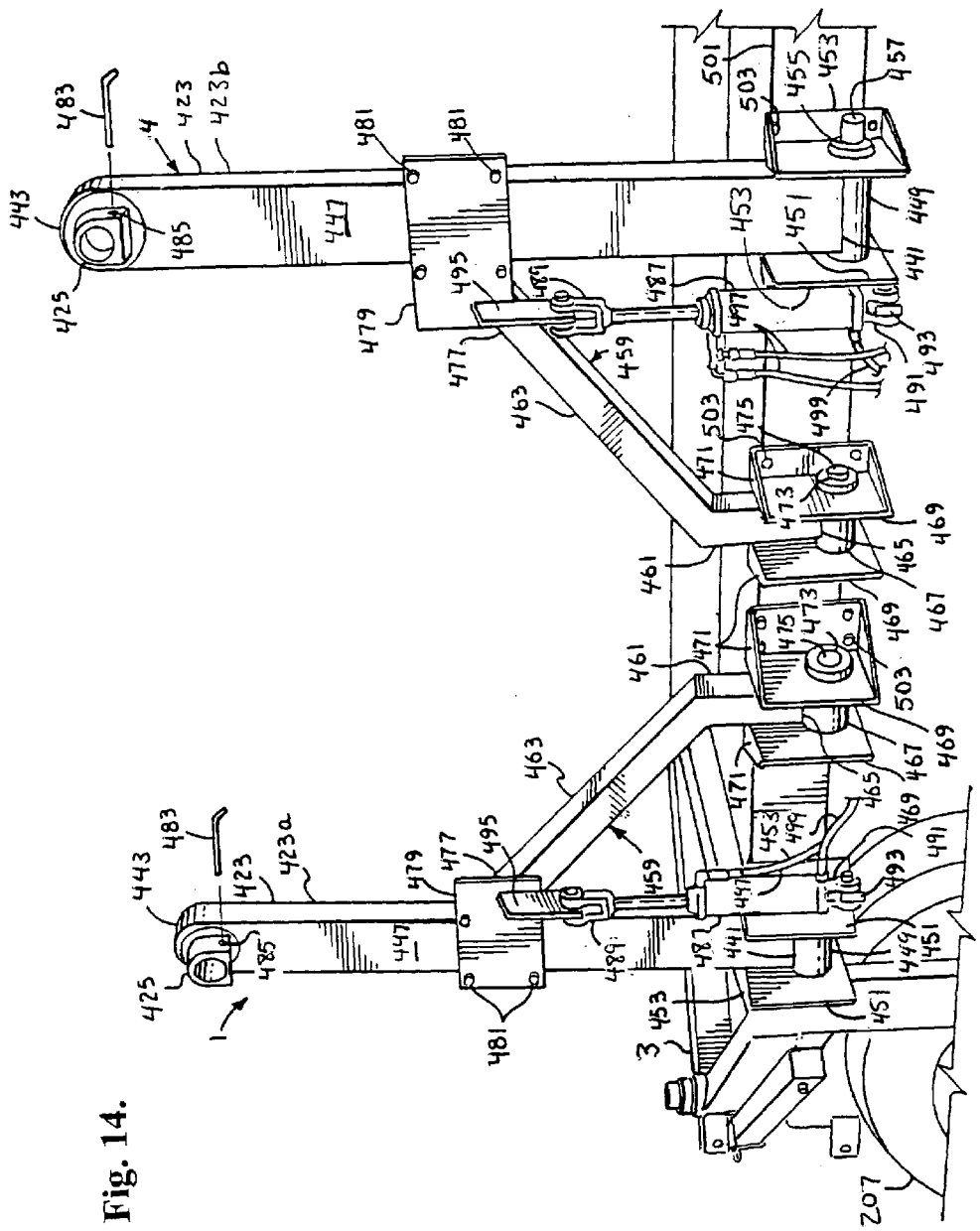
FIG. 14 is a side view of the implement showing the mounting of a pair of hitch arms which also form a part of the hitch system.

Referring to FIG. 14, the arms 423 include a forward arm 423a and a rearward arm 423b, each of which comprises a steel box beam and has a proximate end 441, a distal end 443, an upper surface 445 and a lower surface 447. The arms 423 are connected to the implement 5 through a transverse tubular pin receiver 449 welded to the proximate end 441 of each arm 423. The pin receivers 449 are received between respective pairs of vertical flanges 451 which extend outwardly from respective arm attaching brackets 453 mounted on the implement frame 3. Each flange 451 has a pin receiver 455 formed therethrough. A respective clevis pin 457 is simultaneously received through each tubular pin receiver 449 and the receivers 455 in the respective pair of flanges 451.

Each arm 423 is reinforced by an outrigger 459 which is similarly formed of steel box beam and includes a hinge portion 461 which is oriented parallel to the respective arm 423 and a connecting portion 463 which lies at an oblique angle to both the respective arm 423 and to the respective hinge portion 461. Each hinge portion 461 has a proximate end 465 with a transverse tubular pin receiver 467 welded thereto. The pin receivers 467 are received between respective pairs of vertical flanges 469 which extend outwardly from respective outrigger brackets 471 mounted on the implement frame 3. Each flange 469 has a pin receiver 473 formed therethrough. A respective clevis pin 475 is simultaneously received through each tubular pin receiver 467 and the receivers 473 in the respective pair of flanges 469. The connecting portions 463 of the outriggers 459 each include a distal end 477 which is welded or otherwise connected to a tie plate 479. The tie plates 479 are, in turn, each connected to the respective arm 423, such as by U-bolts 481. The outrigger 459 connected to the forward arm 423a extends rearwardly from the arm 423a whereas the outrigger 459 connected to the rearward arm 423b extends forwardly from the arm 423b.

The hitch couplers 425 are each mounted on the lower surface 447 of a respective arm 423 proximate its distal end 443. The couplers 425 are sized to matingly receive the hitch balls 421 mounted on the tractor 2. The couplers 425 may be self-latching or include pins 483 receivable through openings 485 in the couplers 425 for latching the couplers to the hitch balls 421.

Each of the arms 423 is equipped with a respective double acting hydraulic cylinder 487 or other linear actuator capable of moving the respective arm 423 between a lowered an laterally extending working position and a raised transport position. Each cylinder 487 has opposed ends 489 and 491. One of the ends 489 or 491 of each cylinder 487 is connected to a lower lug 493 extending outwardly from the bracket 453 securing the respective arm 423 to the harvester 1. The other end 489 or 491 of each cylinder 487 is connected to an upper lug 495 which extends outwardly from the respective tie plate 479. Hydraulic hoses 497 and 499 connect each cylinder 487 to a hydraulic system of the harvester 1 or tractor 2. While the harvester 1 is in use, the hydraulic system may be adjusted to allow the cylinders 487 to "float" or allow relative movement between the harvester and tractor 2 to adjust to the terrain.

The arms 423 are preferably selectively longitudinally moveable relative to the harvester 1 so that the arms 423 may be aligned with the placement of the hitch balls 421 on the tractor 2. For example, if the harvester frame 3 includes an elongate tubular member 501, the brackets 453 and 471 may be secured to the tubular member 501 using U-bolts 503. The U-bolts 503 may be loosened to allow the arms 423 to be repositioned longitudinally along the tubular member 501 and then tightened to secure the arms 423 in the selected position.

Referring to FIG. 15, the towing hitch 408 is used for towing the harvester 1 behind the towing vehicle 2, for example while transporting the harvester 1 along roads or between fields. The towing hitch 408 includes a removable tongue 505 having a proximate end 507 and a distal end 509. The distal end 509 includes hitch means 511 for connecting the distal end 509 to the rear of the towing vehicle 2. The hitch means 511 is pictured as a pintle loop 513 receivable by a conventional pintle hook 514 (see FIG. 1) mounted on the rear of the towing vehicle 2. It is to be understood, however, that the hitch means 511 could also comprise a ball coupler, clevis hitch, or other known hitch means. The proximate end 507 of the tongue 505 includes a horizontal pin receiver 515. A first clevis 519 mounted on a forward facing surface of the dolly wheel carrier 209 of the harvester 1 includes horizontal pin receivers 521. The tongue 505 is releasably attached to the harvester 1 by inserting a clevis pin 522 simultaneously through the pin receivers 515 and 521.

The harvester 1 is easily towed behind the towing vehicle 2 with the tongue 505 connected to the wheel carrier 209 as described, however it has been found that backing the implement, such as into a storage building, may be difficult in this configuration because the tongue 505 tends to jackknife when the wheel carrier 209 unexpectedly pivots about its vertical pivot 211. In order to make backing easier, the towing hitch may include a second clevis 523 mounted on a forward facing surface of the harvester frame 3. The second clevis 523 includes horizontal pin receivers 525. When it is desired to back up the harvester 1, the tongue 505 may be releasably attached to the harvester 1 as shown in FIG. 5 by inserting the clevis pin 522 (or an identical pin 526) simultaneously through the pin receivers 515 and 525.

The task of hooking the tongue 505 to the towing vehicle 2 is made easier by an optional tongue support stand 527 which allows for one-person hitching. The stand 527 includes an elongate leg 529 have a lower end 531 with a foot 533 attached thereto. The leg 529 further includes an upper end 535 which is pivotally attached to the tongue 505 by a bracket 537. The bracket 537 is mounted to the underside of the tongue 505 proximate its distal end 509 and generally includes a pair of longitudinal side flanges 539 and a transverse front plate 541 welded between the side flanges 539. The side flanges 539 are spaced apart to receive the leg 529 therebetween. The leg 529 is attached to the flanges 539 by a pivot pin 542 which passes through aligned holes in the leg 529 and flanges 539. The leg 529 is moveable between a lowered tongue supporting position and a raised traveling position. In the tongue supporting position (see FIG. 15), the leg 529 is in abutting relation with the front plate 541 and is retained in position by a lock pin 543 which is inserted through aligned openings 545 in the side flanges 539 behind the leg 529. When the leg 529 is in the raised position (see FIG. 16), the foot 533 is in close proximity to the tongue 505. The leg 529 is retained in the raised position by inserting the lock pin 543 through aligned openings 547 in the side flanges 539 below the leg 529.

Figure 17:
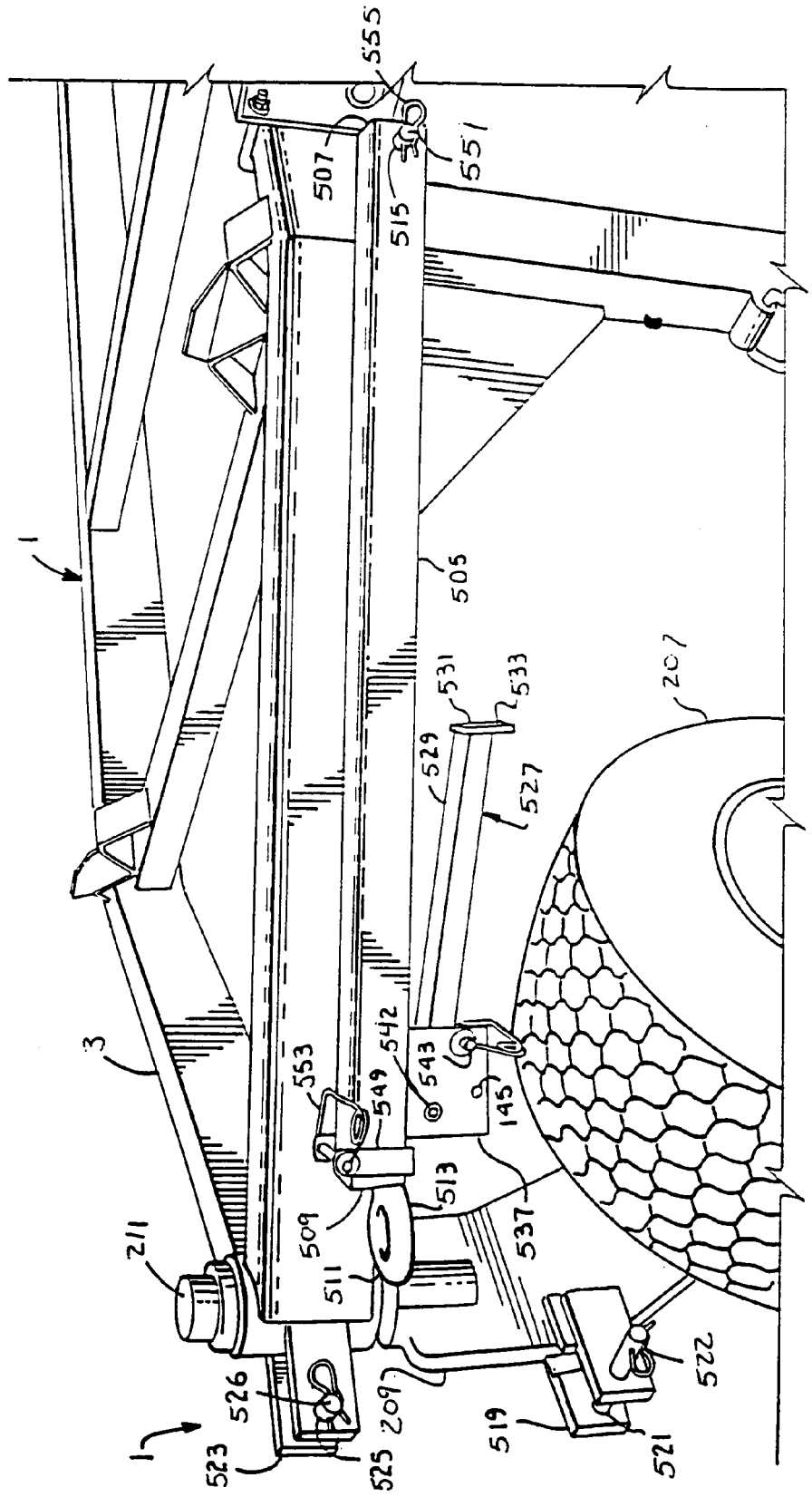
FIG. 17 is a fragmentary perspective view of the implement showing the towing hitch in a storage configuration.

When the tongue 505 is not in use, it may be attached to the implement frame 3 for storage as shown in FIG. 17. A U-shaped bracket 549 and a pin 551 extending outwardly from the frame 3 are provided for this purpose. When the tongue 505 is stored, pin 551 extends through the pin receiver 515 in the proximate end 507 of the tongue 505 and bracket 549 receives a portion of the tongue 505 near the distal end 509. Retaining pins 553 and 555 extend through openings in the bracket 549 and pin 551, respectively, to retain the tongue 505 in place.

In use, the harvester 1 is towed into a field behind a towing vehicle 2 using the towing hitch 408. The tongue 505 is then disconnected from both the towing vehicle 2 and the wheel carrier 209 and stored on the implement frame 3. The towing vehicle is then pulled alongside and parallel to the harvester 1 such that the hitch balls 421 are aligned with the respective arms 423. The hydraulic cylinders 487 are then activated to lower the arms 423 into the working position and bring the couplers 425 into engagement with the hitch balls 421. If the couplers 425 are not self latching, pins 483 may be inserted through openings 485 in the couplers 425 to secure the couplers to the hitch balls 421.

When it is desired to disconnect the harvester 1 for transport, the couplers 425 are first unlatched, such as by removing the pins 483. The hydraulic cylinders 487 are then activated to raise the arms 423 into the transport position.

The tongue 505 is then removed from the implement frame 3 and connected to the wheel carrier 209 by inserting the clevis pin 520 through the pin receiver 515 in the tongue 505 and the pin receivers 521 in the first clevis 519. The tongue 505 may be supported on the tongue support stand 527 by removing the lock pin 543 from the openings 547 in the side flanges 539 and lowering the leg 529 into the tongue supporting position. The leg 529 is retained in position by inserting the lock pin 543 through the openings 545 in the side flanges 539 behind the leg 529. The towing vehicle 2 can then be moved around to the front of the harvester 1 and the hitch means 511 connected to the rear of the towing vehicle 2. The leg 529 is then moved into the raised position and the lock pin 543 inserted through the openings 547 in the side flanges 539 below the leg 529. The harvester 1 may then be towed to the next field or to a storage area.

If it is necessary to back up the harvester 1, for example to move it into a machine shed or storage area, the tongue 505 may be disconnected from the first clevis 519 on the wheel carrier 425 and connected to the second clevis 523 on the implement frame 3 by inserting the clevis pin 420 or 426 through the pin receivers 515 and 525. This procedure will prevent the tongue 505 from jackknifing during backing.

It is to be understood that while certain forms of the present invention have been illustrated and described herein, it is not to be limited to the specific forms or arrangement of parts described and shown. For example, it is to be understood that the towing vehicle used in combination with the towing hitch 408 to transport the harvester 1 need not be the same towing vehicle or tractor 2 used in combination with the side hitch 4 to pull the harvester 1 in the field. It is also to be understood that the harvester 1 on which the hitching system 1 can be used need not be limited to sod harvesters, as the hitching system 1 may be easily adapted to other implements 1 such as specialized vegetable harvesters, forage harvesters and balers, etc. The towing hitch 408, in particular, may be applicable to a wide variety of tow behind implements 1 such has hay rakes and the like.

It is further to be understood that hitch balls 421 on the towing vehicle 2 and couplers 425 on the arms 423 are not the only coupling means which could be used to couple the distal ends 443 of the arms 423 to the towing vehicle 2. For example, it is foreseen that the hitch balls 421 could be on the arms 423 and that the couplers 425 could be mounted on the towing vehicle 2. It is also foreseen that other types of coupling means such as pintle hooks and loops, pins and receivers with spherical ball joints, and any of a variety of known coupling means could also be used. It is likewise foreseen that the arms 423 could be pivotally connected to the towing vehicle 2 instead of the harvester 1 and selectively engage coupling means on the harvester 1.

Harvester Ground Wheel Drive Assembly

Referring to FIG. 6, a hydraulic motor 560, referred to as an outer wheel drive motor, is shown connected to an axle 562 of right rear wheel or outer rear wheel 202 through planetary gear assembly 564. Hydraulic motor 560 is used to supply power to outer rear wheel 202 to overcome any tendency of the tractor 2 to veer to the side on which the harvester 1 is mounted, which is the right side in FIG. 6. Hydraulic fluid for the hydraulic motor 560 may be supplied from one of the hydraulic pumps 154 or directly from a hydraulic fluid supply system integrated into the tractor. Use of the tractor integrated hydraulic fluid supply system is believed to be preferable, in that the speed of the outer wheel drive motor 560 may be more easily adjusted by the operator of the tractor 2 from the tractor cab to vary the speed of the motor 560 to the extent necessary to overcome the tendency of the tractor 2 to veer toward the side on which the harvester 1 is mounted.

It is to be understood that while certain forms of the present invention have been illustrated and described herein, it is not to be limited to the specific forms or arrangement of parts described and shown.

What is claimed and desired to be secured by Letters Patent is as follows:

1. A control system for a sod harvester having a cutting head for stripping sod from the ground, and a cut-off mechanism for cutting the sod to length, said control system comprising:
   a) a computer processor;
   b) a hydraulic actuator connected to the sod cut-off mechanism and operable to actuate said mechanism to cut the sod to length; and
   c) a valve operable by said processor controlling flow of hydraulic fluid to said hydraulic actuator; wherein
   d) said sod cut-off mechanism includes a blade having a downwardly oriented cutting edge and mounted on a moveable linkage in a plane generally transverse to a ground surface;
   e) said processor causes said valve to open at a selected interval to drive said cutting edge of said blade downwardly into the ground to cut the sod to length;
   f) said moveable linkage is a parallelogram linkage having a fixed leg connected to the harvester, a moveable support member and a pair of pivoting links connecting said moveable support member to said fixed leg; and
   g) said blade is connected to a lower end of said moveable support member.

2. A control system for a sod harvester having a cutting head for stripping sod from the ground and a cut-off mechanism for cutting the sod to length, said control system comprising:
   a) a computer processor;
   b) a hydraulic actuator connected to the sod cut-off mechanism and operable to actuate said mechanism to cut the sod to length;
   c) a valve operable by said processor controlling flow of hydraulic fluid to said hydraulic actuator; and
   d) a sensor for sensing information which can be used to determine a distance traveled by said sod harvester; wherein
   e) said computer processor is programmed to receive said information from said sensor, to determine a distance traveled by said sod harvester, and to cause said hydraulic actuator connected to said linkage to extend to drive said blade downwardly into the ground when said processor determines that said sod harvester has traveled a preselected distance and to subsequently cause said hydraulic actuator to retract to draw said blade upwardly out of the ground.

3. A control system for a sod harvester having a cutting head for stripping sod from the ground, and a cut-off mechanism for cutting the sod to length, said control system comprising:
   a) a computer processor;
   b) a hydraulic actuator connected to the sod cut-off mechanism and operable to actuate said mechanism to cut the sod to length; and
   c) a valve operable by said processor controlling flow of hydraulic fluid to said hydraulic actuator; wherein
   d) said sod cut-off mechanism includes a blade having a downwardly oriented cutting edge and mounted on a moveable linkage in a plane generally transverse to a ground surface;

e) said processor causes said valve to open at a selected interval to drive said cutting edge of said blade downwardly into the ground to cut the sod to length; and said control system further including a ground speed sensor communicating a signal to said processor indicative of ground speed, said processor using information gathered from said sensor to determine said interval.

4. A control system for a sod harvester having a cutting head for stripping sod from the ground, a cut-off mechanism for cutting the sod to length, and a first conveyor for conveying the sod away from the cutting head, said control system comprising:
   a) a computer processor;
   b) a hydraulic actuator connected to the sod cut-off mechanism and operable to actuate said mechanism to cut the sod to length; and
   c) a valve operable by said processor controlling flow of hydraulic fluid to said hydraulic actuator; said processor causing said valve to open at a selected interval to cut the sod to length;
   d) a ground speed sensor communicating a signal to said processor indicative of ground speed, said processor using information gathered from said sensor to determine said interval; and
   e) a first hydraulic motor driving the first conveyor and a first flow control valve controlling flow of hydraulic fluid to said first hydraulic motor, said first flow control valve being operated by said processor to control the speed of the first conveyor.

5. The control system as in claim 4 wherein said processor uses information from said ground speed sensor to set the speed of the first conveyor relative to ground speed.

6. The control system as in claim 5 and further including a first conveyor speed sensor providing a signal indicative of the speed of the first conveyor to said processor, said processor comparing the speed of the first conveyor to ground speed and adjusting the speed of the first conveyor based upon said comparison.

7. The control system as in claim 6 adapted for a sod harvester having a second conveyor receiving the sod from the first conveyor, said control system further including a second hydraulic motor driving the second conveyor and a second flow control valve controlling flow of hydraulic fluid to said second hydraulic motor, said second flow control valve being operated by said processor to control the speed of the second conveyor.

8. The control system as in claim 7 wherein said processor uses information from said ground speed sensor and the first conveyor speed sensor to set the speed of the second conveyor relative to ground speed or the speed of the first conveyor.

9. The control system as in claim 5 and further including a second conveyor speed sensor providing a signal indicative of the speed of the second conveyor to said processor, said processor comparing the speed of the second conveyor to ground speed or the speed of the first conveyor and adjusting the speed of the first conveyor based upon said comparison.

10. A control system for a sod harvester having a cutting head for stripping sod from the ground and a first conveyor for conveying the sod away from the cutting head, said control system comprising:
   a) a first hydraulic motor driving the first conveyor;
   b) a computer processor;
   c) a first flow control valve operable by said processor to control flow of hydraulic fluid to said first hydraulic motor;
   d) a ground speed sensor including a pulse pickup connected to a ground wheel of the sod harvester and communicating a first signal to said processor indicative of ground speed; and
   e) a first conveyor speed sensor providing a second signal indicative of the speed of the first conveyor to said processor, wherein
   f) said processor operates said first flow control valve in response to said first signal to set the speed of the first conveyor relative to ground speed, and compares the speed of the first conveyor as indicated by said second signal to ground speed and adjusts the speed of the first conveyor based upon said comparison.

11. The control system as in claim 10 adapted for a sod harvester having a second conveyor receiving the sod from the first conveyor, said control system further including a second hydraulic motor driving the second conveyor and a second flow control valve controlling flow of hydraulic fluid to said second hydraulic motor, said second flow control valve being operated by said processor to control the speed of the second conveyor.

12. The control system as in claim 11 wherein said processor uses information from said ground speed sensor and the first conveyor speed sensor to set the speed of the second conveyor relative to ground speed or the speed of the first conveyor.

13. The control system as in claim 12 and further including a second conveyor speed sensor providing a third signal indicative of the speed of the second conveyor to said processor, said processor comparing the speed of the second conveyor to ground speed or the speed of the first conveyor and adjusting the speed of the first conveyor based upon said comparison.

14. A control system for a sod harvester having a cutting head for stripping sod from the ground and a cut-off mechanism for cutting the sod to length, said control system comprising:
   a) a computer processor;
   b) a hydraulic actuator connected to the sod cut-off mechanism; and
   c) a valve operable by said processor controlling flow of hydraulic fluid to said hydraulic actuator; wherein
   d) the cut-off mechanism includes a parallelogram linkage having a fixed leg connected to the harvester, a moveable support member, a pair of pivoting links connecting said moveable support member to said fixed leg and a blade connected to a lower end of said moveable support member;
   e) said hydraulic actuator is connected between said fixed leg and one of said pivoting links and operable to drive said blade downwardly into the ground and thereby cut the sod to length; and
   f) said processor causes said valve to open at a selected interval to cut the sod to length.

15. The control system as in claim 14 wherein said hydraulic actuator is connected between said fixed leg and a lower one of said links such that extension of said hydraulic actuator causes said blade to move downwardly.

16. A control system for a sod harvester having a cutting head for stripping sod from the ground and a cut-off mechanism for cutting the sod to length, said control system comprising:
   a) a computer processor;
   b) a hydraulic actuator connected to the sod cut-off mechanism;
   c) an accumulator holding hydraulic fluid at a relatively high pressure; and
   d) a valve operable by said processor controlling flow of hydraulic fluid to said hydraulic actuator; wherein e) said sod cut-off mechanism includes a blade mounted on a moveable linkage connected to the sod harvester;
f) said hydraulic actuator is operable to actuate said cut-off mechanism to drive said blade downwardly into the ground and thereby cut the sod to length; and
g) said processor causes said valve to open at a selected interval to place said hydraulic actuator in communication with said accumulator to cut the sod to length.

17. The control system as in claim 16 wherein said valve is pilot controlled and opens upon receipt of a pilot signal from a controlled source of pilot pressure.

18. The control system as in claim 17 wherein said controlled source of pilot pressure is a solenoid actuated valve controlled by a said computer processor.

* * * * *